United States Patent
Aly et al.

(10) Patent No.: US 12,035,297 B2
(45) Date of Patent: *Jul. 9, 2024

(54) COEXISTENCE INTERFERENCE AVOIDANCE BETWEEN TWO DIFFERENT RADIOS OPERATING IN THE SAME BAND

(71) Applicant: Magic Leap, Inc., Plantation, FL (US)

(72) Inventors: Aly H. M. Aly, Coral Springs, FL (US); Cuthbert Martindale Allen, Miramar, FL (US); Humberto Eduardo Garcia, Davie, FL (US); Sumanth Murali, Redwood City, CA (US); Juan Leopoldo Ballen, Parkland, FL (US); Christopher Michael Lopez, Davie, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,540

(22) Filed: Feb. 10, 2023

(65) Prior Publication Data

US 2023/0276428 A1 Aug. 31, 2023

Related U.S. Application Data

(63) Continuation of application No. 17/260,153, filed as application No. PCT/US2019/042573 on Jul. 19, 2019, now Pat. No. 11,627,587.

(Continued)

(51) Int. Cl.
*H04W 24/08* (2009.01)
*G06F 3/14* (2006.01)
(Continued)

(52) U.S. Cl.
CPC .......... *H04W 72/1215* (2013.01); *G06F 3/14* (2013.01); *H04W 24/08* (2013.01); *H04W 76/15* (2018.02)

(58) Field of Classification Search
CPC . H04W 72/1215; H04W 24/08; H04W 76/15; H04W 88/06
See application file for complete search history.

(56) References Cited

U.S. PATENT DOCUMENTS 6,850,221 B1 2/2005 Tickle
8,594,150 B1 * 11/2013 Husted ................. H04B 1/7143
375/135

(Continued)

FOREIGN PATENT DOCUMENTS

WO 2015172098 A1 11/2015
WO 2020023303 A1 1/2020

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Hashim S Bhatti
*Assistant Examiner* — Hector Reyes
(74) *Attorney, Agent, or Firm* — Tobias Intellectual Property Law, PLLC

(57) ABSTRACT

Systems and methods for adaptive frequency hopping for reducing or avoiding electromagnetic interference between two radios operating in the same radio frequency (RF) band are provided. In one aspect, a host device, which includes first and second wireless radios and a hardware processor, can use adaptive frequency hopping among a plurality of RF channels to reduce interference. The device can control the first wireless radio to establish a first wireless connection with a terminal device via a first subset of channels, determine a set of performance statistics for the channels, and replace at least one of the first subset of the channels with a new channel within the plurality of channels based on the (Continued)

statistics. For example, a channel can be replaced if a packet error rate (PER) exceeds a threshold.

16 Claims, 16 Drawing Sheets

Related U.S. Application Data

(60) Provisional application No. 62/702,225, filed on Jul. 23, 2018.

(51) Int. Cl.
*H04W 72/12* (2023.01)
*H04W 76/15* (2018.01)

(56) References Cited

U.S. PATENT DOCUMENTS

| | | | |
|---|---|---|---|
| 10,651,690 B2* | 5/2020 | Elliott | H02J 50/23 |
| 2006/0028436 A1 | 2/2006 | Armstrong | |
| 2007/0064669 A1 | 3/2007 | Classon et al. | |
| 2007/0081123 A1 | 4/2007 | Lewis | |
| 2007/0183338 A1* | 8/2007 | Singh | H04W 16/14 |
| | | | 370/252 |
| 2008/0095126 A1 | 4/2008 | Mahany et al. | |
| 2009/0296785 A1* | 12/2009 | Wu | H04W 88/06 |
| | | | 375/132 |
| 2010/0322287 A1 | 12/2010 | Truong et al. | |
| 2012/0127062 A1 | 5/2012 | Bar-Zeev et al. | |
| 2012/0162549 A1 | 6/2012 | Gao et al. | |
| 2013/0077551 A1 | 3/2013 | Lo et al. | |
| 2013/0082922 A1 | 4/2013 | Miller et al. | |
| 2013/0117377 A1 | 5/2013 | Miller | |
| 2013/0125027 A1 | 5/2013 | Abovitz et al. | |
| 2013/0203432 A1 | 8/2013 | Wang et al. | |
| 2013/0208234 A1 | 8/2013 | Lewis | |
| 2013/0242262 A1 | 9/2013 | Lewis et al. | |
| 2014/0071539 A1 | 3/2014 | Gao et al. | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2015/0016777 A1 | 1/2015 | Abovitz et al. | |
| 2015/0049745 A1 | 2/2015 | Han et al. | |
| 2015/0103306 A1 | 4/2015 | Kaji et al. | |
| 2015/0105121 A1 | 4/2015 | Emmanuel et al. | |
| 2015/0133185 A1 | 5/2015 | Chen et al. | |
| 2015/0156662 A1* | 6/2015 | Bai | G08G 1/163 |
| | | | 370/231 |
| 2015/0178939 A1 | 6/2015 | Bradski et al. | |
| 2015/0205126 A1 | 7/2015 | Schowengerdt et al. | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao et al. | |
| 2016/0026253 A1 | 1/2016 | Bradski et al. | |
| 2016/0309489 A1* | 10/2016 | Gan | H04L 69/28 |
| 2018/0103392 A1 | 4/2018 | Emmanuel et al. | |
| 2018/0213414 A1* | 7/2018 | Be | H04B 1/3822 |
| 2019/0341811 A1 | 11/2019 | Elliott et al. | |
| 2020/0120033 A1* | 4/2020 | Wolberg | H04W 28/0205 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/ azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality-Merging Real and Virtual Worlds," 2005 https://web.media.mit.edu/raskar/book/BimberRaskarAugmentedRealityBook.pdf.
Chokshi, Ronak, "Yes! Wi-Fi and Bluetooth Can Coexist in Handheld Devices," Marvell, White Paper—Mar. 2010, www.marvell.com, in 9 pages.
International Preliminary Report on Patentability for PCT Application No. PCT/US2019/042573, issued Jan. 26, 2021.
International Search Report and Written Opinion for PCT Application No. PCT/US2019/042573, mailed Oct. 2, 2019.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Wikipedia, "List of WLAN Channels," Wikipedia, retrieved Jul. 12, 2018, https://en.wikipedia.org/wiki/List_of_WLAN_channels, in 10 pages.

* cited by examiner

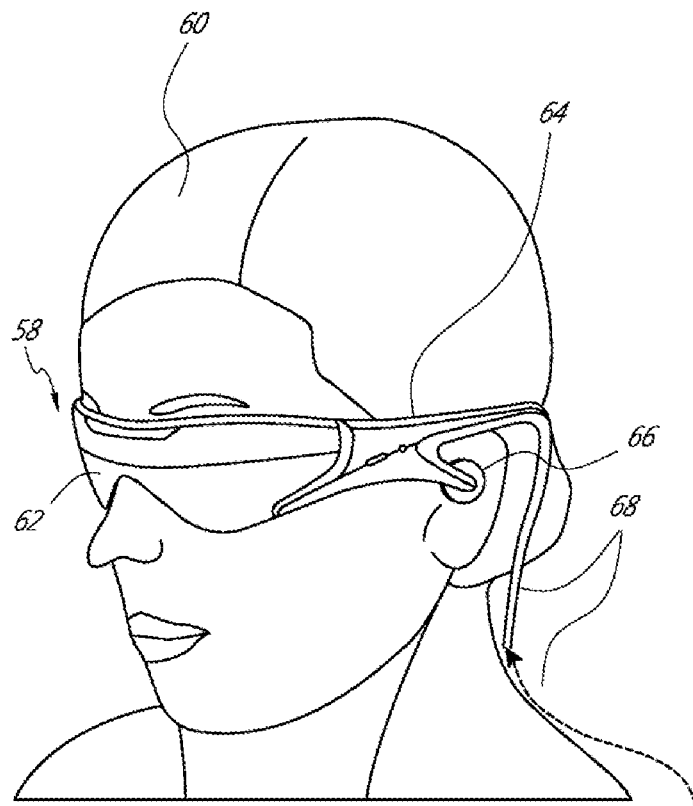
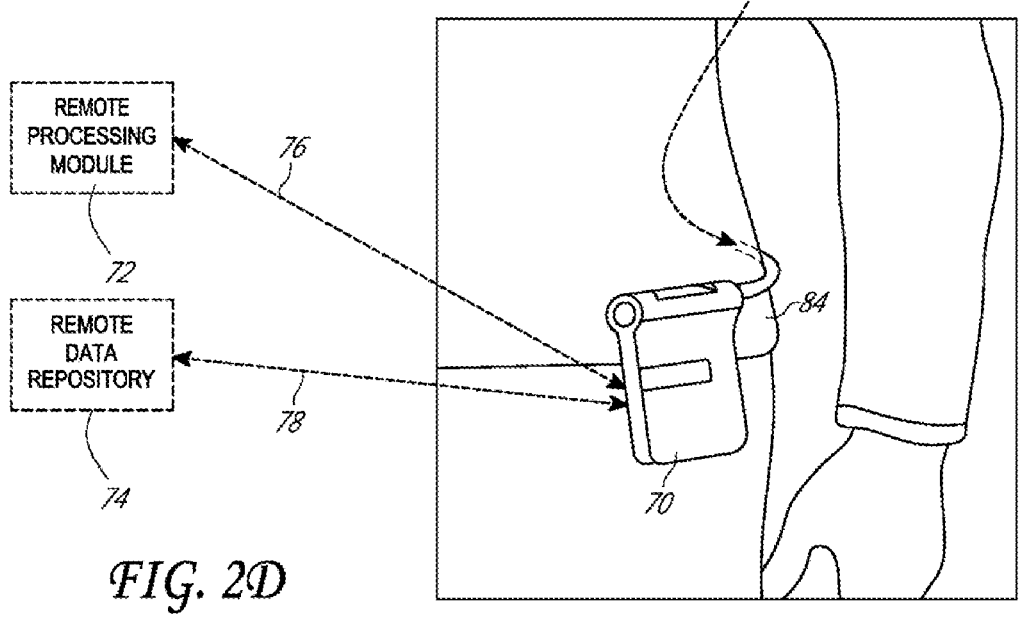
FIG. 2D

700

PKT Transmit Totem: 2000
Received Packets BeltPack: 1836
ACK Received Totem: 1642
PER: 17.9

| | T-Channel #1 | T-Channel #2 | T-Channel #3 | T-Channel #4 | T-Channel #5 |
|---|---|---|---|---|---|
| | 3 | 26 | 41 | 49 | 66 |
| T-Worst RSSI | -75 (CH1) | -61 (CH2) | -61 (CH3) | -63 (CH#4) | -81 (CH#5) |
| T-Best RSSI | 0 (CH1) | 0 (CH2) | 0 (CH3) | 0 (CH#4) | 0 (CH#5) |
| T-Mean RSSI | -6 (CH1) | -13 (CH2) | -8 (CH3) | -12 (CH#4) | -4 (CH#5) |
| Channel PER | 27 (Ch 1) | 4 (Ch 2) | 14 (Ch 3) | 5 (Ch 4) | 39 (Ch 5) |

BELT-PACK RSSI ANALYSIS DATA

| | PP-Channel # | PP-Channel #2 | PP-Channel #3 | PP-Channel #4 | PP-Channel #5 |
|---|---|---|---|---|---|
| | 3 | 26 | 41 | 49 | 66 |
| PP-Worst RSSI | -74 (CH1) | -58 (CH2) | -57 (CH3) | -60 (CH #4) | -79 (CH #5) |
| PP-Best RSSI | -60 (CH1) | -50 (CH2) | -50 (CH3) | -54 (CH #4) | -53 (CH #5) |
| PP-Mean RSSI | -62 (CH1) | -52 (CH2) | -53 (CH3) | -57 (CH #4) | -65 (CH #5) |
| Channel PKTS | 365 (Ch 1) | 390 (Ch 2) | 380 (Ch 3) | 386 (Ch 4) | 315 (Ch 5) |

REPORT PATCH

*FIG. 7*

COEXISTENCE INTERFERENCE AVOIDANCE BETWEEN TWO DIFFERENT RADIOS OPERATING IN THE SAME BAND

CROSS-REFERENCE TO RELATED APPLICATIONS

This patent application is a continuation of U.S. patent application Ser. No. 17/260,153, which was filed on Jan. 13, 2021 as a national stage entry of International Application No. PCT/US2019/042573, which was filed on Jul. 19, 2019 and which claims the priority and benefit of U.S. Provisional Patent Application No. 62/702,225, which was filed on Jul. 23, 2018. Each of these applications is incorporated by reference herein in its entirety.

BACKGROUND

Field

This disclosure generally relates to systems and methods for reducing or avoiding coexistence interference between two different radios operating in the same radio frequency (RF) band and more particularly to augmented or virtual reality systems utilizing multiple radios.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. AR or VR systems can communicate using wireless radio frequency (RF) techniques.

SUMMARY

In various aspects, a wearable display system may include a host device, which may be separate component such as a belt-based subsystem, configured to communicate wirelessly with a plurality of other wireless devices. To provide sufficient bandwidth to communicate with all of the other devices while meeting stringent communication requirements (e.g., signal quality, power, isolation, latency, time availability, or concurrent operation), the host device may include two or more wireless communication radios. The two or more radios may operate substantially in the same radio frequency (RF) band, which can lead to interference between at least some of the two or more radios. Aspects of this disclosure relate to systems and methods for reducing interference between the radios, which may involve hopping between available communication channels for at least one of the radios so that it broadcasts or receives on a different channel with less potential interference.

Examples of systems and methods for adaptive frequency hopping for reducing or avoiding electromagnetic interference between two radios operating in the same radio frequency (RF) band are provided. In one aspect, a host device, which includes first and second wireless radios and a hardware processor, can use adaptive frequency hopping among a plurality of RF channels to reduce interference. The device can control the first wireless radio to establish a first wireless connection with a terminal device via a first subset of channels, determine a set of performance statistics for the channels, and replace at least one of the first subset of the channels with a new channel within the plurality of channels based on the statistics. For example, a channel can be replaced if a packet error rate (PER) exceeds a threshold.

The RF coexistence interference avoidance techniques described herein are not limited to AR or VR applications and in other implementations can be applied to any device or component that utilizes multiple radios operating in the same RF band.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIGS. 2A-2D schematically illustrate examples of a wearable system.

FIG. 7 depicts a screenshot of an example of a link Packet Error Rate (PER) tool illustrating statistics for a plurality of wireless communication channels.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

It may be desirable to include a plurality of wireless communication radios within a host device (e.g., a belt-based processing subsystem of a wearable display such as, e.g., described with reference to FIGS. 1-4 below) to provide sufficient bandwidth to communicate with a plurality of the other wireless devices while meeting stringent communication requirements (e.g., signal quality, power, isolation, latency, time availability, or concurrent operation).

In an AR or VR context, a passable world model may include information about the real world as well as other data which can be used to create an AR or VR experience for the user. The wearable display can wirelessly obtain the passable world model via the host device. The host device may also wirelessly communicate with a hand held user-input component, various sensing components (e.g., an inertial measurement unit (IMU), a camera, electromagnetic tracking devices, a global positioning system (GPS) transceiver, etc.), and so forth. For example, some of these sensing components track the pose (e.g., position or orientation) of a user's hands or head in real time, leading to high bandwidth and low latency requirements for providing an enjoyable user experience with the AR or VR system.

If the stringent communication requirements cannot be met, the user's AR or VR experience may suffer. By using two or more dedicated wireless communication radios that coexist in the host device, the communication bandwidth can be increased. However, since the communication radios may operate in the same RF band (e.g., at 2.4 GHz) and may be located physically close to each other in the device, the two radios may electromagnetically interfere with each other, leading to packet communication errors which may cause severe performance degradation.

Aspects of this disclosure can reduce this coexistence interference by performing an adaptive channel or frequency hopping algorithm. The communication band may include a plurality of channels defined by overlapping (or non-overlapping) frequency bands, a subset of which may be used at any given time for wireless communication. In some aspects, the host device can monitor the performance of the channels and "hop" from one channel to another channel when the performance of the current channel falls below certain threshold requirements. Accordingly, host devices that implement embodiments of the adaptive channel or frequency hopping techniques can provided improved performance (e.g., reduced interference, higher bandwidth, reduced latency, higher signal quality, etc.). AR or VR systems that utilize such host devices thereby offer the user an improved and more enjoyable user experience.

Overview of AR and VR

Figure 1:
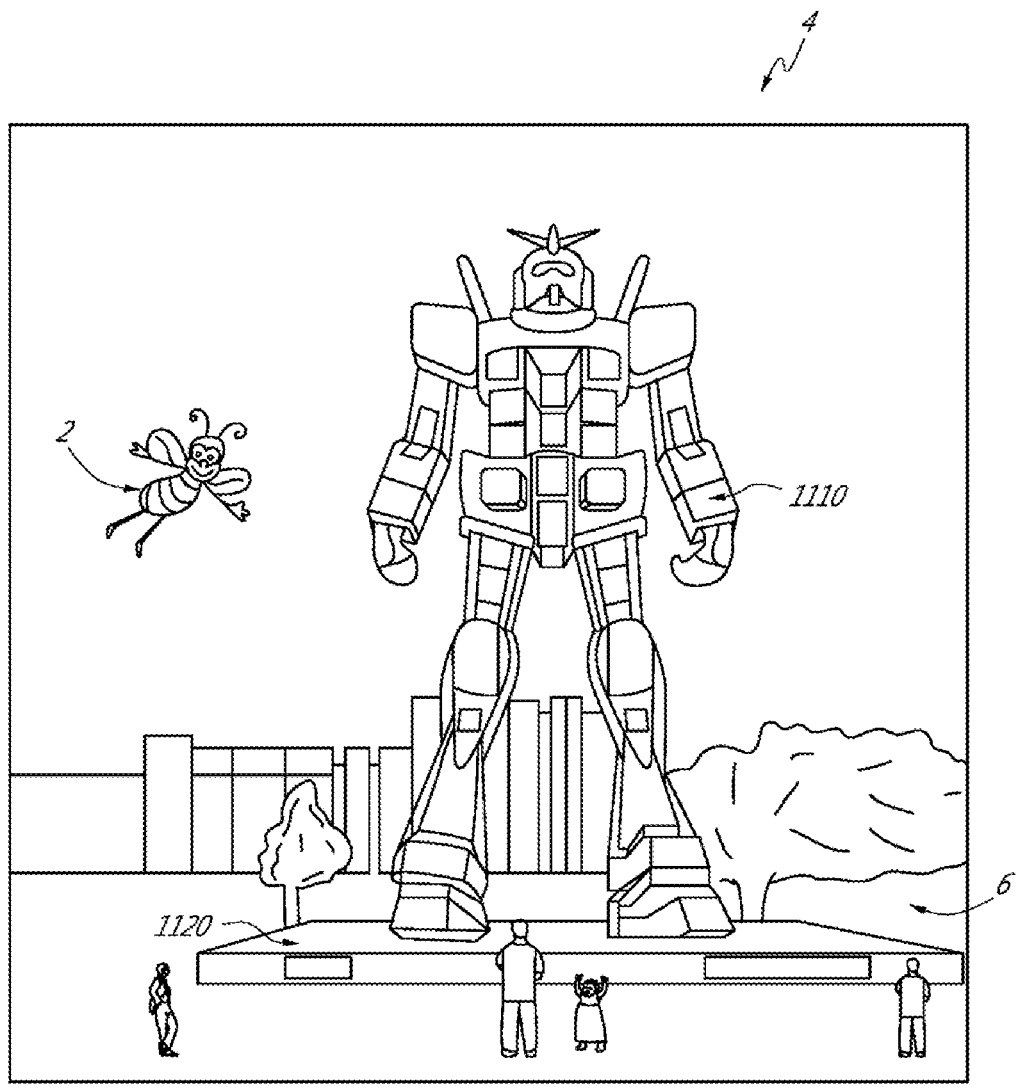
FIG. 1 depicts an illustration of an augmented reality scenario with certain virtual reality objects, and certain physical objects viewed by a person.

In FIG. 1 an augmented reality scene 4 is depicted wherein a user of an AR technology sees a real-world park-like setting 6 featuring people, trees, buildings in the background, and a concrete platform 1120. In addition to these items, the user of the AR technology also perceives that he "sees" a robot statue 1110 standing upon the real-world platform 1120, and a cartoon-like avatar character 2 flying by which seems to be a personification of a bumble bee, even though these elements 2, 1110 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

Example AR and VR Systems and Components

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
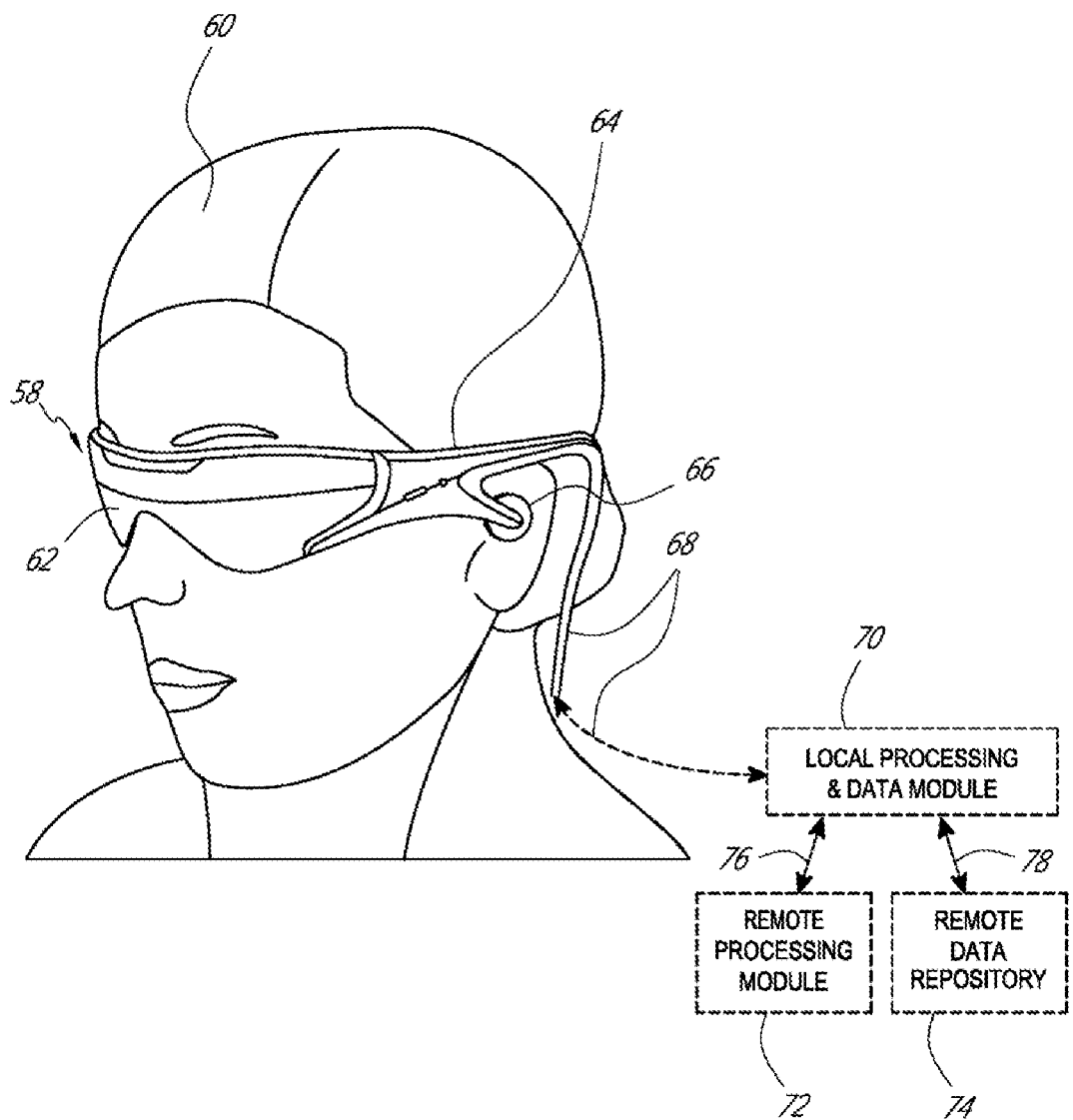
Figure 2B:
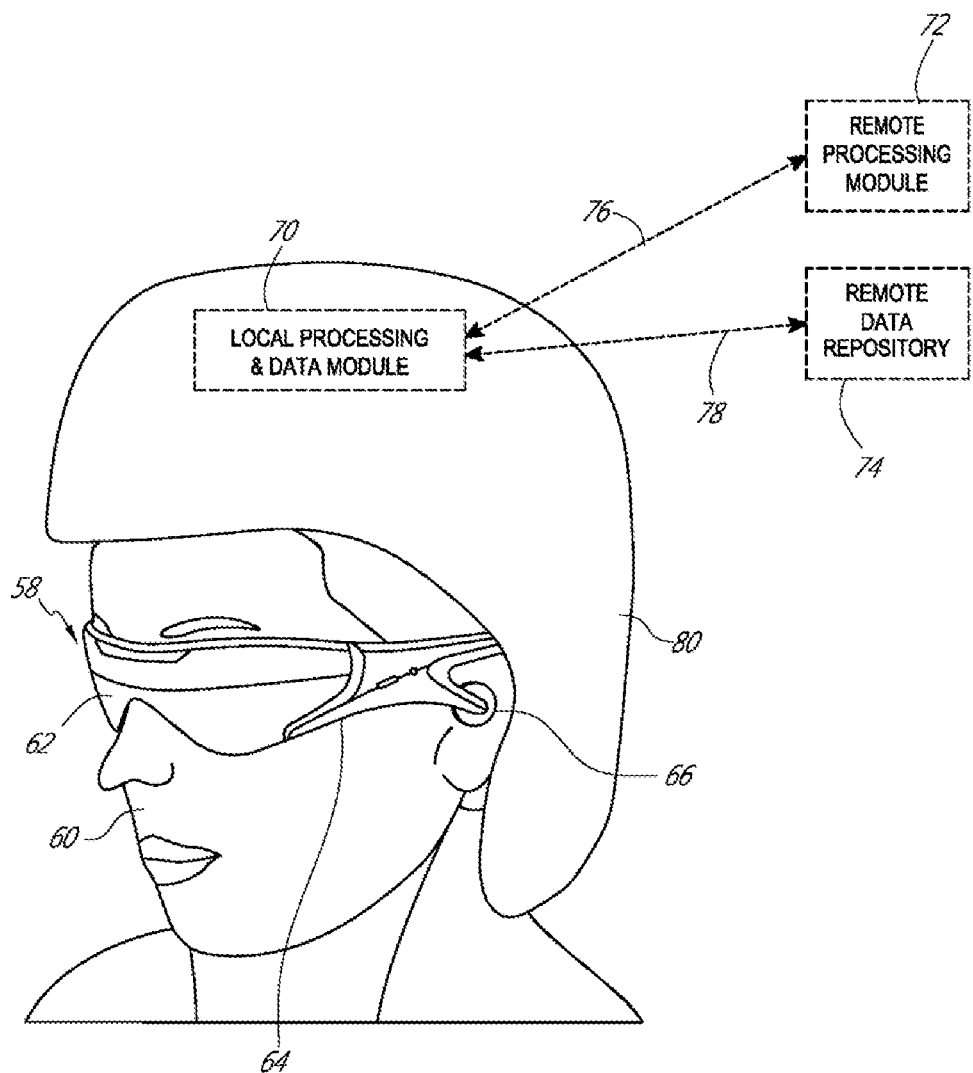
Figure 2C:
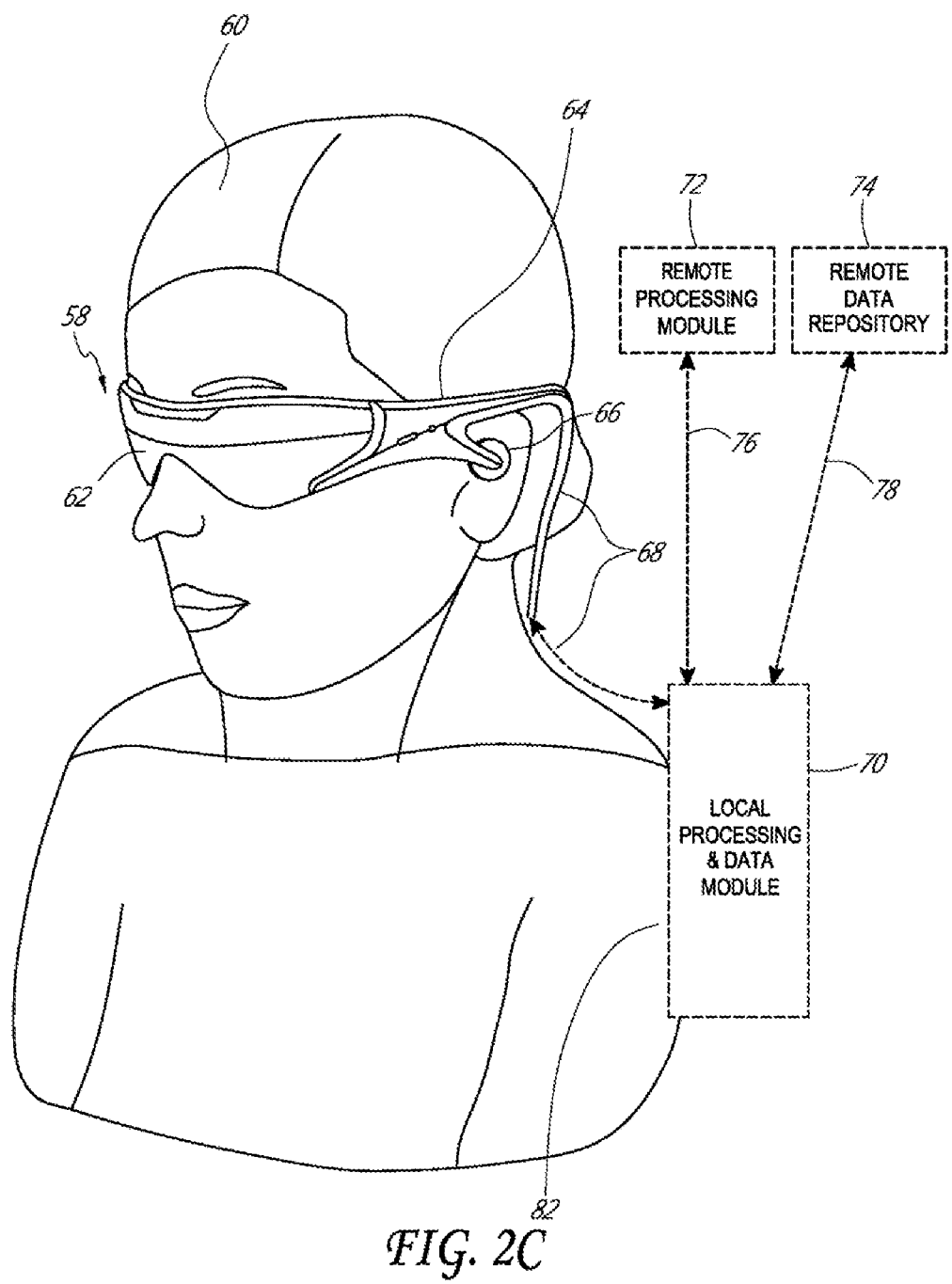

As shown in FIG. 2A, an AR system user 60 is depicted wearing head mounted component 58 featuring a frame 64 structure coupled to a display system 62 positioned in front of the eyes of the user. A speaker 66 is coupled to the frame 64 in the depicted configuration and positioned adjacent the ear canal of the user (in one embodiment, another speaker, not shown, is positioned adjacent the other ear canal of the user to provide for stereo/shapeable sound control). The display 62 is operatively coupled 68, such as by a wired lead or wireless connectivity, to a local processing and data module 70 which may be mounted in a variety of configurations, such as fixedly attached to the frame 64, fixedly attached to a helmet or hat 80 as shown in the embodiment of FIG. 2B, embedded in headphones, removably attached to the torso 82 of the user 60 in a backpack-style configuration as shown in the embodiment of FIG. 2C, or removably attached to the hip 84 of the user 60 in a belt-coupling style configuration as shown in the embodiment of FIG. 2D.

The local processing and data module 70 may comprise a power-efficient processor or controller, as well as digital memory, such as flash memory, both of which may be utilized to assist in the processing, caching, and storage of data a) captured from sensors which may be operatively coupled to the frame 64, such as image capture devices (such as cameras), microphones, inertial measurement units, accelerometers, compasses, GPS units, one or more radio devices, and/or gyroscopes; and/or b) acquired and/or processed using the remote processing module 72 and/or remote data repository 74, possibly for passage to the display 62 after such processing or retrieval. The local processing and data module 70 may be operatively coupled 76, 78, such as via a wired or wireless communication links, to the remote processing module 72 and remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
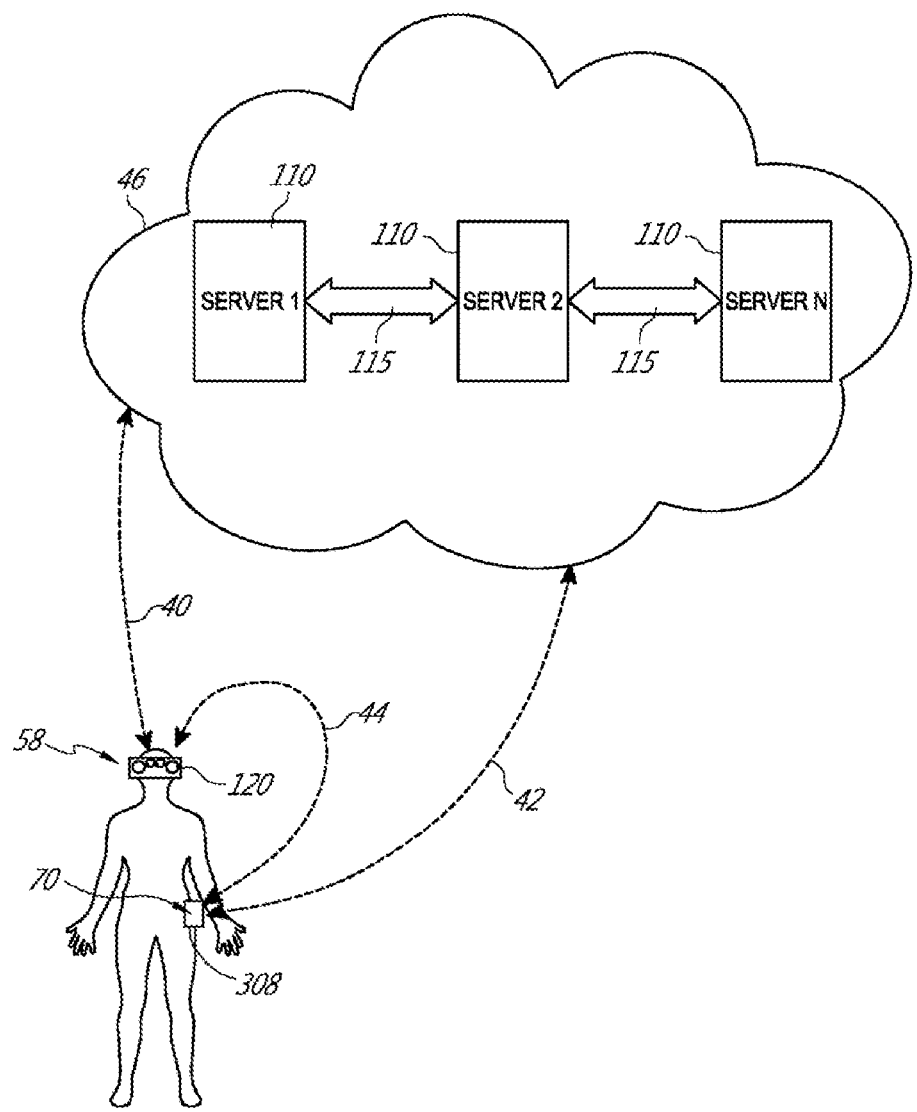
FIG. 3 schematically illustrates coordination between cloud computing assets and local processing assets.

Referring now to FIG. 3, a schematic illustrates coordination between the cloud computing assets 46 and local processing assets, which may, for example reside in head mounted componentry 58 coupled to the user's head 120 and a local processing and data module 70, coupled to the user's belt 308; therefore the component 70 may also be termed a "belt pack" 70, as shown in FIG. 3. In one embodiment, the cloud 46 assets, such as one or more server systems 110 are operatively coupled 115, such as via wired or wireless networking (wireless being preferred for mobility, wired being preferred for certain high-bandwidth or high-data-volume transfers that may be desired), directly to 40, 42 one or both of the local computing assets, such as processor and memory configurations, coupled to the user's head 120 and belt 308 as described above. These computing assets local to the user may be operatively coupled to each other as well, via wired and/or wireless connectivity configurations 44, such as the wired coupling 68 discussed below in reference to FIG. 4. In one embodiment, to maintain a low-inertia and small-size subsystem mounted to the user's head 120, primary transfer between the user and the cloud 46 may be via the link between the subsystem mounted at the belt 308 and the cloud, with the head mounted 120 subsystem primarily data-tethered to the belt-based 308 subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system 62 shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Three-dimensional (3-D) points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. Patent Pub. No. 2014/0306866, entitled "System and method for augmented and virtual reality", which is incorporated by reference in its entirety herein, along with the following additional disclosures, which related to augmented and virtual reality systems such as those developed by Magic Leap, Inc. of Plantation, Florida: U.S. Patent Pub. No. 2015/0178939; U.S. Patent Pub. No. 2015/0205126; U.S. Patent Pub. No. 2014/0267420; U.S. Patent Pub. No. 2015/0302652; U.S. Patent Pub. No. 2013/0117377; and U.S. Patent Pub. No. 2013/0128230, each of which is hereby incorporated by reference herein in its entirety.

GPS and other localization information may be utilized as inputs to such processing. Highly accurate localization of the user's head, totems, hand gestures, haptic devices etc. may be advantageous in order to display appropriate virtual content to the user.

The head-mounted device 58 may include displays positionable in front of the eyes of the wearer of the device. The displays may comprise light field displays. The displays may be configured to present images to the wearer at a plurality of depth planes. The displays may comprise planar waveguides with diffraction elements. Examples of displays, head-mounted devices, and other AR components usable with any of the embodiments disclosed herein are described in U.S. Patent Publication No. 2015/0016777. U.S. Patent Publication No. 2015/0016777 is hereby incorporated by reference herein in its entirety.

Figure 4:
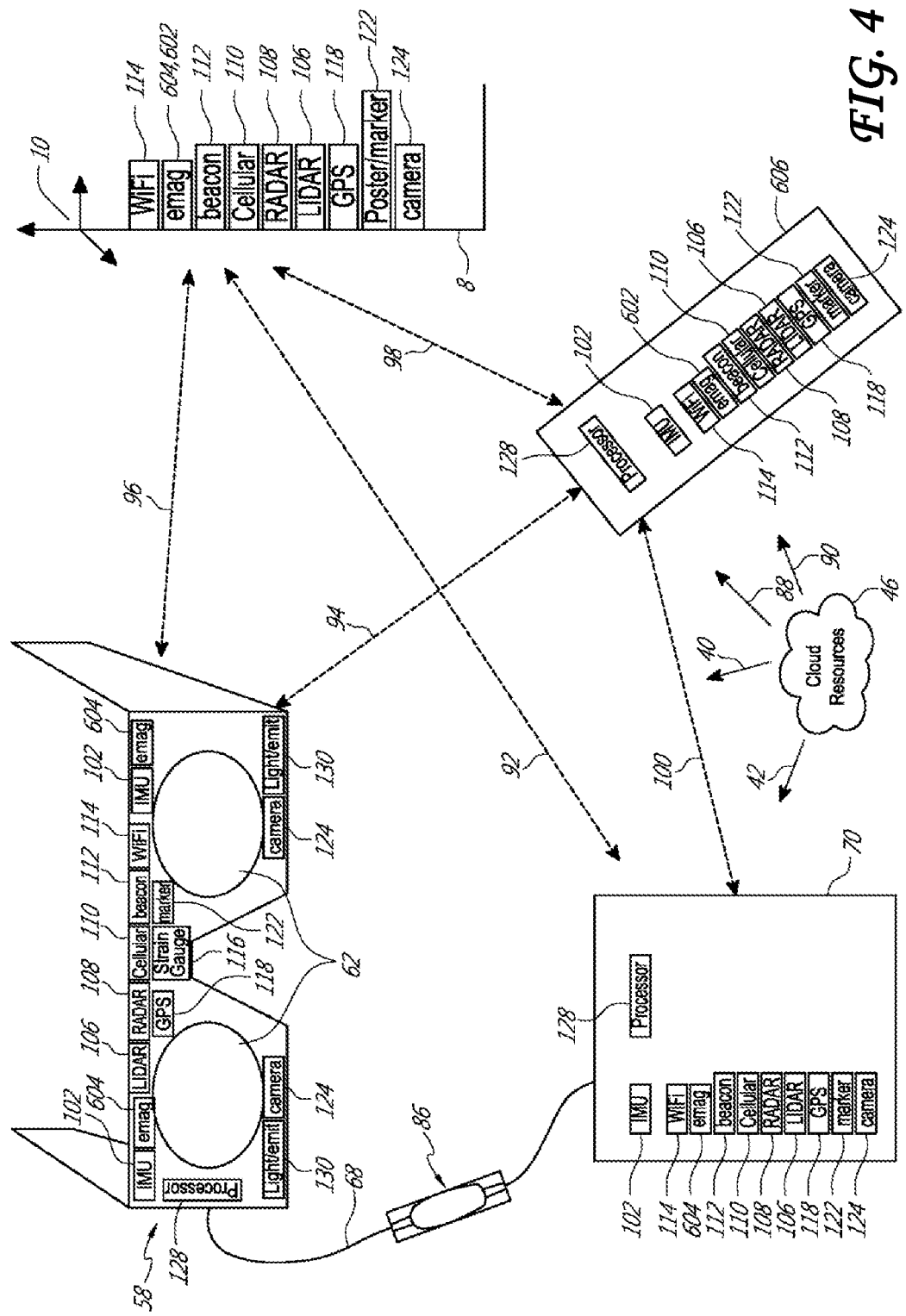
FIG. 4 schematically illustrates examples of components of an embodiment of an AR system.

Referring to FIG. 4, a system configuration is illustrated featuring many sensing components. An embodiment of the head mounted wearable component 58 is shown operatively coupled 68 to a local processing and data module 70, such as a belt pack, here using a physical multicore lead which also features a control and quick release module 86. The control and quick release module 86 can include buttons for operation of the associated system, for example, an on/off button and up/down volume controls. Opposing ends of the module 86 can be connected to electrical leads running between the local processing and data module 70 and the display 62 as shown in FIG. 4.

The local processing and data module 70 is operatively coupled 100 to a hand held component 606, here by a wireless connection such as Bluetooth (BT) or low energy Bluetooth (BLE); the hand held component 606 may also be operatively coupled 94 directly to the head mounted wearable component 58, such as by a wireless connection such as, e.g., BT or BLE. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor 604 and transmitter 602 pairings. Also shown is a global coordinate system 10, representative of fixed objects in the real world around the user, such as a wall 8.

Cloud resources 46 also may be operatively coupled 42, 40, 88, 90 to the local processing and data module 70, to the head mounted wearable component 58, to resources which may be coupled to the wall 8 or other item fixed relative to the global coordinate system 10, respectively. The resources coupled to the wall 8 or having known positions and/or orientations relative to the global coordinate system 10 may include a wireless transceiver 114 (which may include one or more radio frequency (RF) radios), an electromagnetic emitter 602 and/or receiver 604, a beacon or reflector 112 configured to emit or reflect a given type of radiation, such as an infrared LED beacon, a cellular network transceiver 110, a RADAR emitter or detector 108, a LIDAR emitter or detector 106, a transceiver 118, a poster or marker having a known detectable pattern 122, and a camera 124. The wireless transceiver 114 can comprise a transceiver for a wireless local area network (WLAN), such as, e.g., IEEE 802.11, WLAN, WiFi, etc., or a wireless personal area network (WPAN) such as, e.g., Bluetooth (BT), Bluetooth Low Energy (BLE), etc., or a proprietary RF radio, combinations of the foregoing transceivers, or the like. The transceiver(s) 114 can operate in bands such as the 2.4 GHz or dual 2.4/5 GHz bands. The transceiver(s) 114 can include the host device 500 or one or both of the radios 510 or 515 described with reference to FIG. 5. In some embodiments, the wireless transceiver 114 comprises an asynchronous 2.4 GHz radio and implements a protocol for establishing a wireless communications link between the transceiver and other devices (e.g., up to 8 devices) using a channel map of RF wireless communication channels. In some implementations, the channel map includes 80 channels with 1 MHz bandwidth in the 2.4 GHz RF spectral band. Techniques described herein (e.g., described with reference to FIGS. 5-13) can be used by the system to reduce or avoid electromagnetic interference between radios operating in the same RF band (e.g., by adaptively frequency hopping among the channels in the channel list).

The head mounted wearable component 58 features similar components, as illustrated, in addition to lighting emitters 130 configured to assist the camera 124 detectors, such as infrared emitters 130 for an infrared camera 124; also featured on the head mounted wearable component 58 are one or more strain gauges 116, which may be fixedly coupled to the frame or mechanical platform of the head mounted wearable component 58 and configured to determine deflection of such platform in between components such as electromagnetic receiver sensors 604 or display elements 62, wherein it may be valuable to understand if bending of the platform has occurred, such as at a thinned portion of the platform, such as the portion above the nose on the eyeglasses-like platform depicted in FIG. 4.

The head mounted wearable component 58 also features a processor 128 and one or more IMUs 102. Each of the components preferably are operatively coupled to the processor 128. The hand held component 606 and local processing and data module 70 are illustrated featuring similar components. As shown in FIG. 4, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components 58, 70, 606 may be localized in terms of position relative to the global coordinate system using the network transceiver 114 which may comprise wireless local area networks (WLAN), such as, e.g., IEEE 802.11, WiFi, etc., or wireless personal area networks (WPAN) such as, e.g., Bluetooth (BT), Bluetooth Low Energy (BLE), etc., GPS, or Cellular signal triangulation; beacons, electromagnetic tracking as described herein, RADAR, and LIDAR systems may provide yet further location and/or orientation information and feedback. Markers and cameras also may be utilized to provide further information regarding relative and absolute position and orientation. For example, the various camera components 124, such as those shown coupled to the head mounted wearable component 58, may be utilized to capture data which may be utilized in simultaneous localization and mapping protocols, or "SLAM", to determine where the component 58 is and how it is oriented relative to other components.

In some embodiments, in addition or as an alternative to a LIDAR 106 type of depth sensor, the system includes a generic depth camera or depth sensor, which may, for example, be either a stereo triangulation style depth sensor such as a passive stereo depth sensor, a texture projection stereo depth sensor, or a structured light stereo depth sensor, or a time or flight style depth sensor (such as a LIDAR depth sensor or a modulated emission depth sensor); further, the system may include an additional forward facing "world" camera 124 (which may be a grayscale camera, having a sensor capable of 720p range resolution), as well as a relatively high-resolution "picture camera" (which may be a full color camera, having a sensor capable of two megapixel or higher resolution, for example).

Example Systems and Methods for Reducing or Avoiding RF Interference

Rapid and accelerating growth in wireless communication devices (e.g., smart connected devices such as the local processing and data module 70) have led to increased demand for the support of multiple communication technologies that coexist within the same device. This support of multiple communication technologies within a single device may include stringent and competing requirements in terms of signal quality, power, isolation, latency, time availability, or concurrent operation. For example, in the example of FIG. 4, the local processing and data module 70 can be configured to communicate wirelessly with each of the hand held component 606, the cloud resources 46, and the resources which may be coupled to the wall 8 or other item fixed relative to the global coordinate system 10. Rather than employing a single wireless transceiver 114, the local processing and data module 70 can include a two or more wireless transceivers 114, each of which is configured to communicate with a separate one of the hand held component 606, the cloud resources 46, and the resources which may be coupled to the wall 8 or other item fixed relative to the global coordinate system 10. As another example, the wireless transceiver 114 of the local processing and data module 70 may include two or more radios configured to communicate to various sensing components of the AR or VR system. Using such dedicated communications hardware may provide certain advantages over sharing a single wireless transceiver 114, such as increased bandwidth available for communication, lower latency (since the data no longer needs to be communicated serially over a single antenna), etc.

Figure 5:
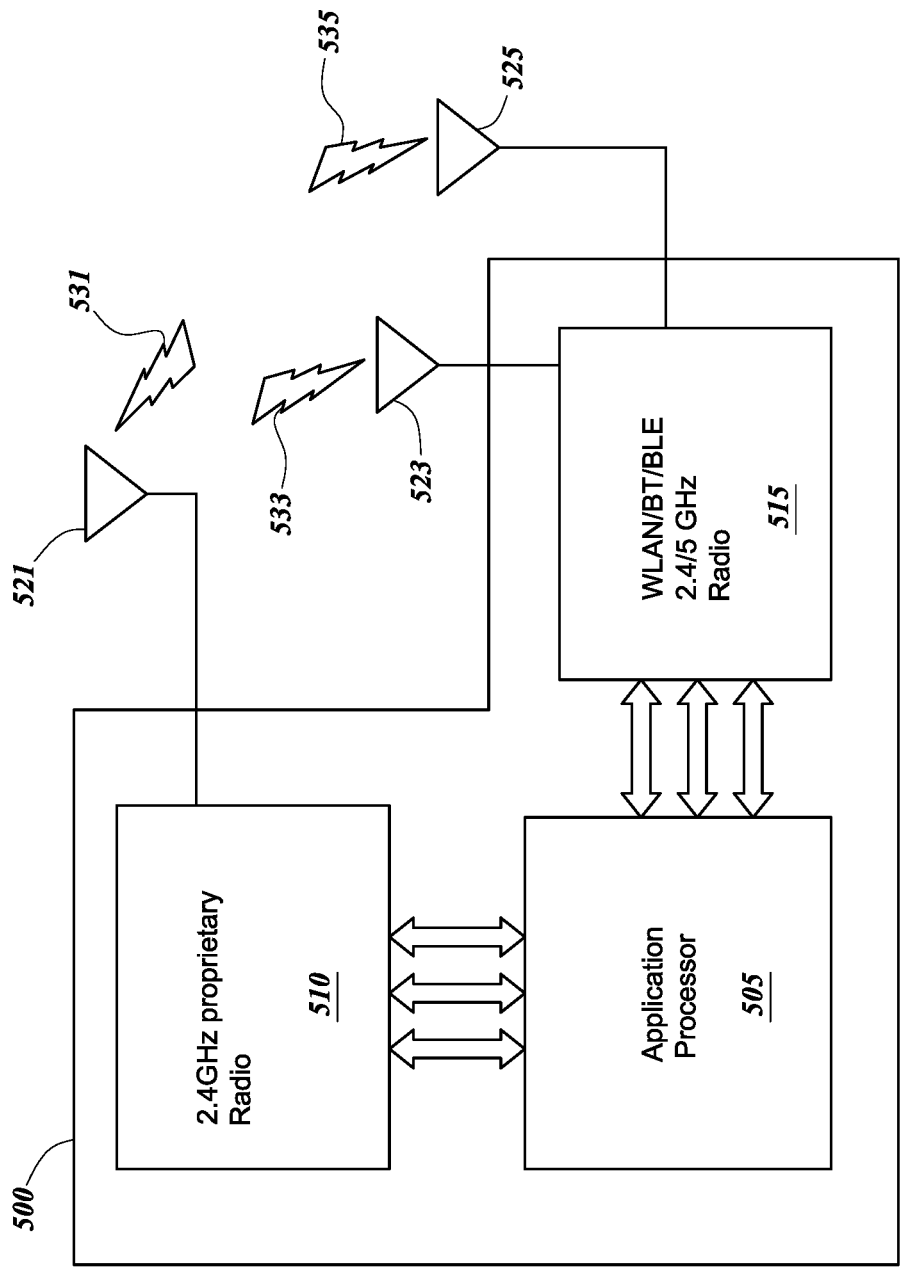
FIG. 5 schematically illustrates a block diagram of an example of a host device including two wireless communication radios.

The coexistence of similar wireless technologies within a device can contribute to RF interference that can cause severe performance degradation. The performance degradation may be exacerbated when two wireless communication technologies are implemented using different chipsets from different vendors with no existing (e.g., built-in) coexistence manager. Referring to FIG. 5, an embodiment of a host device (also referred to simply as a host) 500 having two communication technologies is shown. The host device 500 includes an application processor 505, a 2.4 GHz proprietary radio (also referred to as a proprietary or first radio) 510, and a WLAN/BT/BLE 2.4/5 GHz radio (also referred to as a secondary or second radio) 515. The host device 500 further includes a first antenna 521 operatively coupled to the proprietary radio 510, and a second antenna 523 and a third antenna 525, each of which is operatively coupled to the secondary radio 515. The proprietary radio 510 can be configured to be operatively coupled 531 to another device (not illustrated) via the first antenna 521 operating at, for example, 2.4 GHz. The secondary radio 515 can be configured to be operatively coupled 533 to another device (not illustrated) via the second antenna 523 operating at, for example, 2.4 GHz and operatively coupled 535 to another device (not illustrated) via the third antenna 525 operating at, for example, 5 GHz. In some embodiments, the radios 510, 515 can be configured to operate at different RF frequencies than 2.4 GHz or 5 GHz. The application processor 505 can include electronic circuitry, a controller, application-specific integrated circuits, and the like, to perform interference reduction techniques described herein.

The proprietary radio 510 may be implemented as an asynchronous non-BT based 2.4 GHz radio link and the secondary radio 510 may be implemented as a 2.4/5 GHz dual band BT/BLE/WLAN transceiver with 2×2 multiple-input and multiple-output (MIMO) and real simultaneous support. As shown in FIG. 5, the host device 500 is configured for simultaneous operation of the two radios 510 and 515 within the same operational band (e.g., 2.4 GHz) via the first antenna 521 and the second antenna 523. In some embodiments, the two radios 510 and 515 may not include a built-in coexistence or interference manager. Since there may be no built-in coexistence manager or time synchronization between the two radios 510 and 515, concurrent wireless communication of the radios 510 and 515 can be severely degraded and potentially not operational.

Additionally, as shown in FIG. 5, the antennas 521, 523, and 525 for the two radios 510 and 515 can be co-located in the same host device 500. Due to this co-location, one design consideration for the host device 500 is to provide sufficient electromagnetic isolation between the antennas 521, 523, and 525 (and in particular, between antennas 521 and 523 both operating at 2.4 GHz). However, in some embodiments, design constraints such as the size of the host device 500 and the power required for wireless communications by the two radios 521 and 523 may make providing sufficient isolation between the antennas 521, 523, and 525 impractical or unachievable, resulting in unavoidable mutual cross-talk or desense (e.g., degradation of sensitivity due to noise sources). In particular, the limited size constraints of the host device 500 provides for limited spatial separation of the antennas 521, 523, and 525 on the host device 500.

Although the host device 500 is described as having a proprietary radio 510 and a WLAN/BT/BLE 2.4/5 GHz radio 515 in the embodiment illustrated in FIG. 5, aspects of this disclosure may also be applied to other configurations of the two radios 510 and 515. For example, aspects of this disclosure may also apply to a host device 500 having a first radio 510 and a second radio 515, each of which is configured to wirelessly communicate with one or more other wireless devices. Aspects of this disclosure may improve the performance of one of more of the radios 510 and 515 by lowering the packet error rate (PER) associated therewith when the radios 510 and 515 are susceptible to interference. For example, when the band(s) used by the radios 510 and 515 at least partially overlap, the radios 510 and 515 may be susceptible to interference. Further, the coexistence avoidance techniques described herein are not limited to radios 510, 515 that operate in the 2.4 GHz band, and embodiments of these techniques can be used for radios 510, 515 that operate in any radio frequency (RF) bands that at least partially overlap. For example, radio bands may be in a range from 300 MHz to 300 GHz in various embodiments.

Figure 6:
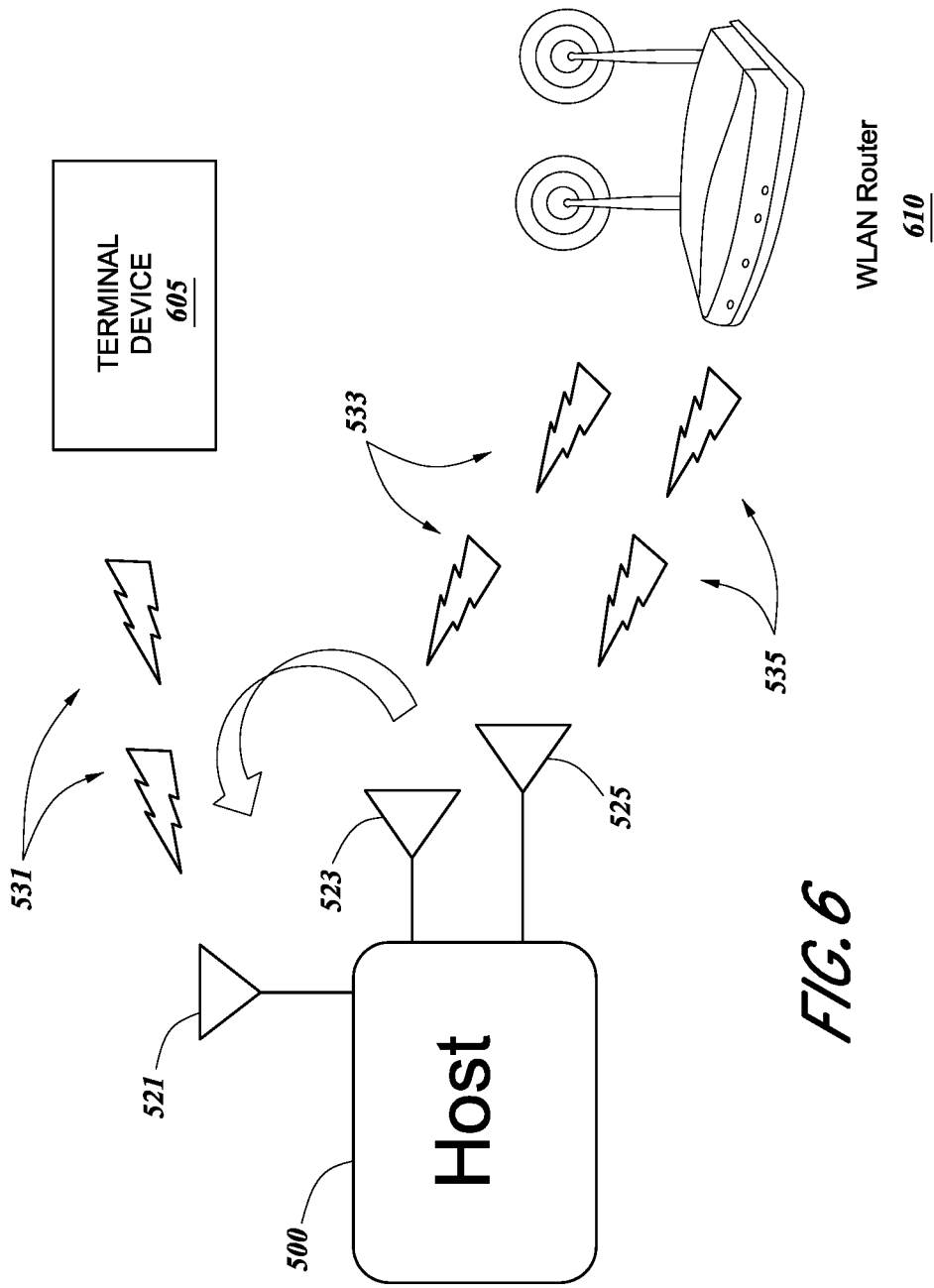
FIG. 6 schematically illustrates a block diagram of an example of a host device in wireless communication with a terminal device and a wireless local area network (WLAN) router.

A particular embodiment of the host device 500 being in wireless communication with two other devices is illustrated in FIG. 6. As shown in FIG. 6, the host device 500 is configured to communicate wirelessly with one or more terminal devices 605 and a WLAN router (also referred to as a router) 610. In particular, the host device 500 may be operatively coupled 531 to the terminal device 605 via the first antenna 521 using the proprietary radio 510. Further, the host device 500 may be operatively coupled 533 and/or 535 to the router 610 via one or more of the second and third antennas 523 and 525 using the secondary radio 515. In various embodiments, the host device 500 can be incorporated into one, some, or all of the components shown in FIG. 4 (e.g., the head mounted component 58, the local processing and data module 70, the hand held component(s) 606, or a component mounted to the wall 8).

In an illustrative embodiment, the one or more terminal devices 605 may be embodied as one or more hand held components 606 (described with reference to FIG. 4) and the host device 500 may be embodied as a local processing and data module 70 (e.g., which may be configured to be coupled to the user's belt 308) such that the proprietary radio 510 is operatively coupled 531 to the one or more hand held components 606. In other embodiments, the terminal device 605 may be embodied as a local processing and data module 70 and the host device 500 may be embodied as one or more hand held components 606 (e.g., the WiFi transceiver 114 shown in FIG. 4). The hand held component(s) 606 can be configured to transmit sensor data (e.g., IMU data from one or more IMUs 102). To accurately localize the hand held component(s) 606 within a global coordinate system, the sensor data is transmitted between the host device 500 and the hand held component(s) 606 with latency lower than a threshold latency and a Packet Error Rate (PER) lower than a threshold PER within the effective range (e.g. within about 1 meter).

At the same time, the host device 500 is configured to be connected to the router 610 at 2.4 GHz and/or 5 GHz for the purpose of uplink/downlink data (e.g., to transmit a passable world model). In the case of WLAN transmit uplink, transmit noise can desense the asynchronous non-BT based 2.4 GHz proprietary radio 510 link receiver on the host device 500, leading to an increased PER beyond the PER threshold and reducing terminal-to-host (e.g., the hand held component 606 to the host device 500) effective range.

In addition to the need of having the secondary radio 515/proprietary radio 510 wireless communications coexist in a constructive fashion, the proprietary radio 510 protocol and/or the secondary radio 515 protocol advantageously should be robust and dynamically able to adapt to distortion or interference introduced in the operating environment. That is, the environment in which the host device 500 is communicating with the terminal device 605 and router 610 may dynamically change in ways that affect the interference between the secondary radio 515 and the proprietary radio 510, and thus, a dynamic technique to address these changes in the environment can be used to reduce interference and maintain a lower PER rate for the proprietary radio 510 and/or the secondary radio 515 communications.

Example Frequency Hopping Algorithm and Frequency Hopping Threshold (FHT)

The proprietary radio 510 can be assigned one or more channels spread across the entire available band in an effort to reduce or minimize interference. The host device 500 and/or the terminal device 605 can run a process to determine available statistics, such as packet error rate (PER), with respect to the channels which may be updated at a regular rate (e.g., every one second). For example, PER can be determined as a ratio of the number of test packets not successfully received by a device relative to the number of test packets sent to the device. In other implementations, other statistics can be used to measure interference such as, e.g., bit error ratio or rate (BER), which can be determined as a ratio of a number of errors that occur in a string of a given number of bits sent to the device relative to the given number of bits or as the rate of bit errors.

The statistics may include a channel packet error rate (ch_PER) for each channel on the channel list. FIG. 7 provides a screenshot of a link PER tool that includes a graphical user interface (GUI) that demonstrates the proprietary radio 510 assigned channels, individual channel PER, and overall system PER. Although FIG. 7 illustrates the channel statistics as presented on a GUI display, the statistical values may be stored in transitory and/or non-transitory memory, for example, for use by a frequency hopping algorithm. The application processor 505 of the host device 500 may perform one or more of the steps of the frequency hopping algorithm described herein.

For reduction or avoidance of interference, a channel PER for a selected channel can be compared to a frequency hopping threshold (FHT). Based at least partly on this comparison, a channel having sufficiently large transmission errors such that channel PER is greater than FHT can be replaced with a new channel. Depending on the embodiment, the threshold value can set to be fixed value or a dynamic value based on the particular requirements of the communication link between the proprietary radio 510 and the terminal device 605 and the applications running on the application processor 505.

When the wireless connection established between the host device 500 and the terminal device 605 experiences excessive interference, the FHT may, in some cases, not reduce overall PER since the overhead associated with excessive channel hoping (e.g., channel hopping at a frequency greater than a threshold frequency) may degrade performance rather than improve performance. Accordingly, under such excessive interference conditions, increasing the FHT may help by reducing the channel hopping frequency, improving overall PER. Thus, the host device 500 may be configured to update the FHT value by measuring or otherwise calculating the amount of interference and updating the FHT accordingly. In some embodiments, to reduce computational resources in the wireless link, the host device 500 may update the FHT depending on the application running on the host device 500. For example, for certain applications it may be acceptable to re-transmit data packets (e.g., relaxed FHT) without impacting the user experience.

The FHT and the channel PER check time (e.g., time(s) at which the channel PER is compared to FHT) are parameters that can be used in determining the overall quality of the communication link. For example, comparatively lower FHT and shorter channel PER check time may lead to a poorer performing communication link in a noisy environment, because each channel is checked for PER frequently and channels are changed more frequently due to the lower threshold. Higher FHT and longer channel PER check time may be suitable in less noisy environments. The host device 500 can monitor the performance of the communication channels and adjust the FHT or the channel PER check time to provide a desired performance of the communication link. For example, if performance is poor, the FHT or the channel PER check time may be increased until performance improves. Accordingly, channel thresholds or check times can be dynamically adjusted based on performance of the host device 500.

Figure 8:
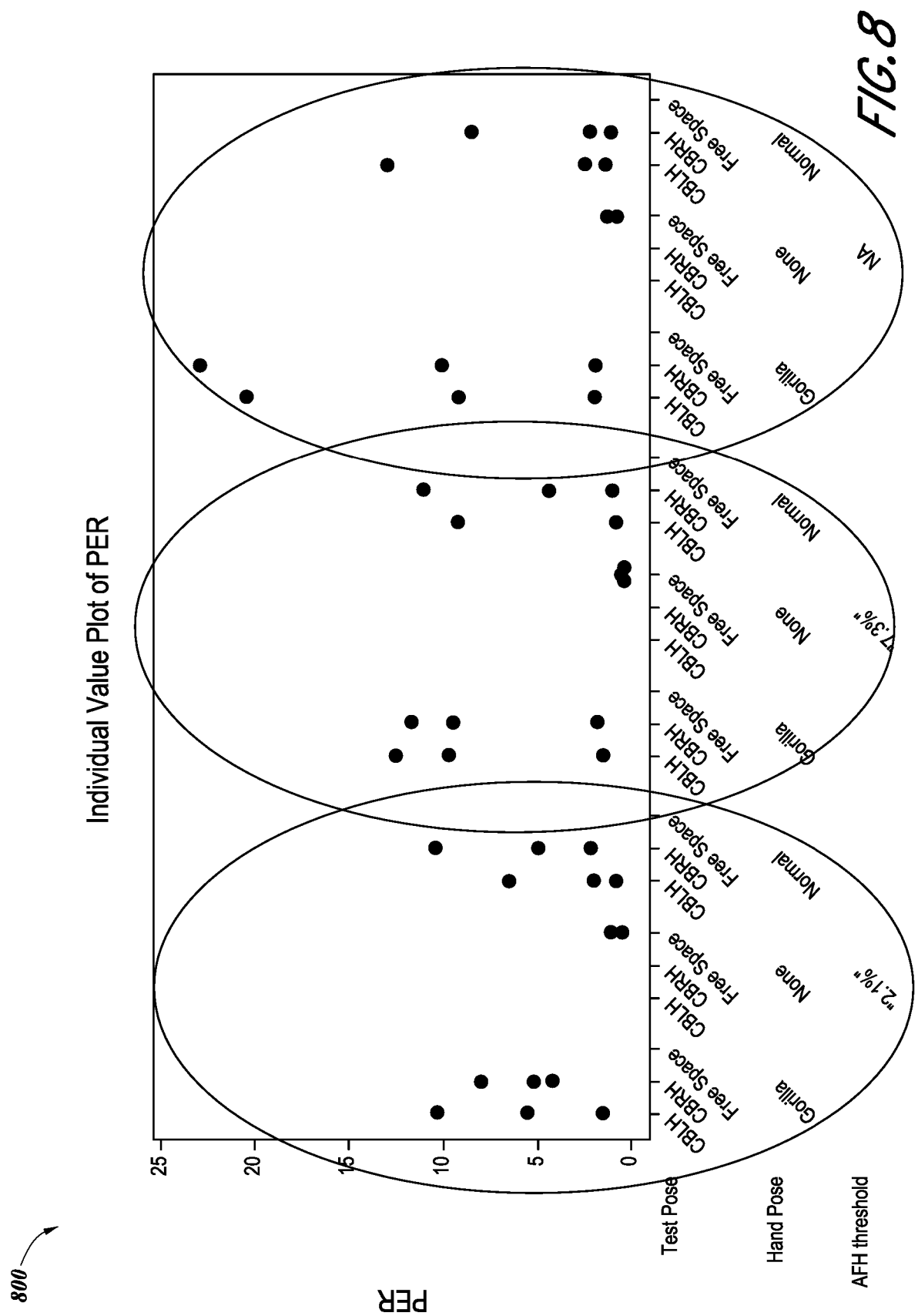
FIG. 8 depicts a graph illustrating examples of overall system PER values using an adaptive frequency hopping (AFH) algorithm with differing variables. The test pose can be cross-body left hand (CBLH), cross-body right hand (CBRH), or free space, and the hand pose can be none, normal, or a gorilla grip.

FIG. 8 includes a scatter plot 800 illustrating an example of overall system PER values using an adaptive frequency hopping (AFH) algorithm with differing variables. Specifically, the scatter plot 800 shows an overall system PER with AFH disabled (AFH threshold marked as N/A on the right-hand side), AFH enabled with an FHT of 7.3% (in the middle), and AFH enabled with an FHT of 2.1% (on the left-hand side). Each of the AFH variable settings was tested under different interference scenarios (free space, cross-body loading, and Hand loading). The test scenarios included test poses that can be cross-body left hand (CBLH), cross-body right hand (CBRH), or free space, and the hand poses can be none, normal, or a gorilla grip. As shown in the scatter plot 800, enabling AFH at either an FHT 7.3% or 2.1% reduces the overall PER compared with AFH disabled. For example, with AFH enabled (with FHT at either 2.1% or the 7.3%), overall system PER was below about 10 for all measured test and hand poses, and test scenarios where PER was above about 20 were eliminated.

As used herein, the term cross-body loading may refer to the user use case at which the host device 500 (e.g., embodied as a belt pack 70) is placed on or near the users back-pocket and the terminal device 605 is held by the user's opposite hand. For example, in one cross-body loading use case, the host device 500 may be placed on or near the user's left back pocket and the user is holding the terminal device 605 in his or her right hand (or alternatively the host device 500 is placed on or near the user's right pocket and the terminal device 605 is held in the user's left hand). In a cross-body loading placement, there is no line of sight between the host device 500 and the terminal device 605 and the user's body will act as lossy medium that will load (e.g., impact) the wireless link between host device 500 and the terminal device 605. The magnitude of the load in cross-body loading can vary depending on the user's body size.

As used herein, the term gorilla grip may refer to the way the user is holding the terminal device 605 via an extremely tight grip that completely engulfs all or a substantial portion (e.g., overlapping the antenna) of the terminal device 605. A gorilla grip may, in some cases, tend to severely impact antenna performance on the terminal device 605 and potentially impact the wireless link losses between the host device 500 and the terminal device 605.

Figure 9:
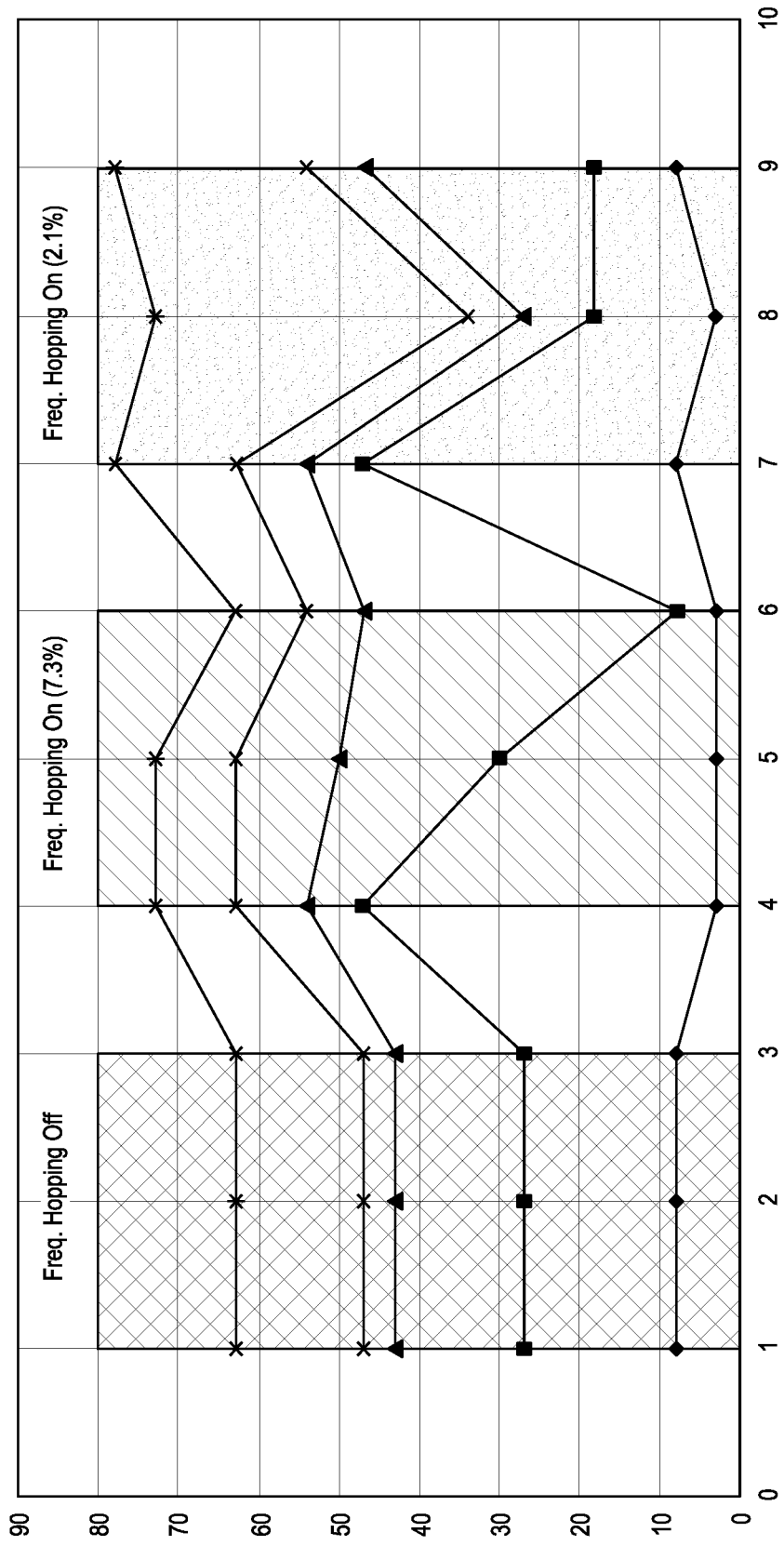
FIG. 9 depicts a graph illustrating an example of the channels assigned to a proprietary radio during the test of the AFH algorithm to produce the overall system PER graph of FIG. 8.

FIG. 9 includes a graph 900 illustrating the channels assigned to the proprietary radio 510 during the test of the AFH algorithm to produce the overall system PER scatter plot 800 of FIG. 8. The graph 900 demonstrates the channel hopping when AFH is enabled with different FHT (off, 7.3%, and 2.1%). The vertical axis of the graph 900 illustrates the channel numbers after channel hopping for each of scenarios 1-9. These scenarios include free space (scenarios 1, 4, and 7), cross body left hand gorilla grip (scenarios 2, 5, and 8), and cross body right hand gorilla grip (scenarios 3, 6, and 9). As illustrated in the graph 900, when AFH is off, the channels do not hop, and in these example test scenarios there is slightly more channel hopping when FHT is 2.1% than when FHT is 7.3%.

Example Frequency Hopping Algorithm

The application processor 505 can perform a frequency hopping algorithm to determine which channel to hop to if a channel statistic (e.g., channel PER) indicates there is substantial interference in that channel (e.g., channel PER>FHT).

In some embodiments, the frequency hopping algorithm may include one or both of two constraints which may improve the robustness of the algorithm (e.g., as measured by system PER). These constraints are: a) while AFH is enabled, the assignment of two consecutive channels to the proprietary radio 510 is not allowed and, at minimum, two or more channels are required for separation between any two assigned channels to reduce the impact of relative broadband noise; and b) in case the host device 500 moves out of range (e.g., with respect to the terminal device 605) under a severe interference scenario, the host device 500 will try to reconnect to the terminal device 605 at the last channel sets with minimum PER.

In some embodiments, after the terminal device 605 determines the channel statistics with the finding that at least one of the channels is experiencing interference (e.g., channel PER>FHT), the terminal device 605 sends a message to the host device 500. The message can contain the channel statistics, and the host device 500 can locate the "bad" channels (e.g., in a channel map) exhibiting significant interference, and with the knowledge of the entire channel map, the host device 500 can replace the channels experiencing interference with new channels that maintain one or more of the following rules: (1) the new channel does not coincide with an active channel in the second radio 515 if that radio is enabled (e.g., broadcasting WLAN/WiFi/BT/BLE), (2) the new channel has a minimum channel separation (e.g., 2 or more channels) from other channels in the channel map to reduce or avoid channel clumping, or (3) the new channel has not been recently reported as experiencing interference (to avoid hopping back onto a bad channel).

Rather than directly sending the statistics (e.g., channel PER) to the host device 500, in some embodiments the terminal device 605 may send data from which the statistics can be derived to the host device 500. In these embodiments, the host device 500 may determine the statistics from the received data. For example, the terminal device 605 may send a message to the host device 500 including the number of test packets not successfully received by the terminal device 605 and the number of test packets sent to the terminal device 605 over a defined period of time.

Example of Secondary Radio-Notification and Frequency Selective Channels

When the secondary radio 515 is enabled, especially in uplink mode, severe degradation in the proprietary radio 510 link and in some high interference cases, loss of the communication link, may be observed. One technique which can be used to mitigate this interference is to enable channel broadcasting at which the host device 500 is set to listen for a specified period of time to any broadcast message on the status of the router 610 on the 2.4 GHz band (e.g., whether 2.4 GHz communication is turned on or off) and on the assigned channel (e.g., channel 1, 6, or 11) of the router 610. The host device 500 may store a look-up table (LUT) in memory which the host device 500 can use to store a list of blocked channels that fall within the active WLAN spectrum. For example, if WLAN is enabled and the WLAN router 610 is communicating over 2.4 GHz on channel 1, the first N channels may be blocked from use by the proprietary radio 510 by updating the channel map stored in the look-up table. In some embodiments, the number N of blocked channels is 5, 10, 20, 30, 40, 50, 60, or more. The frequency hopping algorithm will not permit hopping to a channel that is blocked, to reduce interference between the radios.

Figure 10:
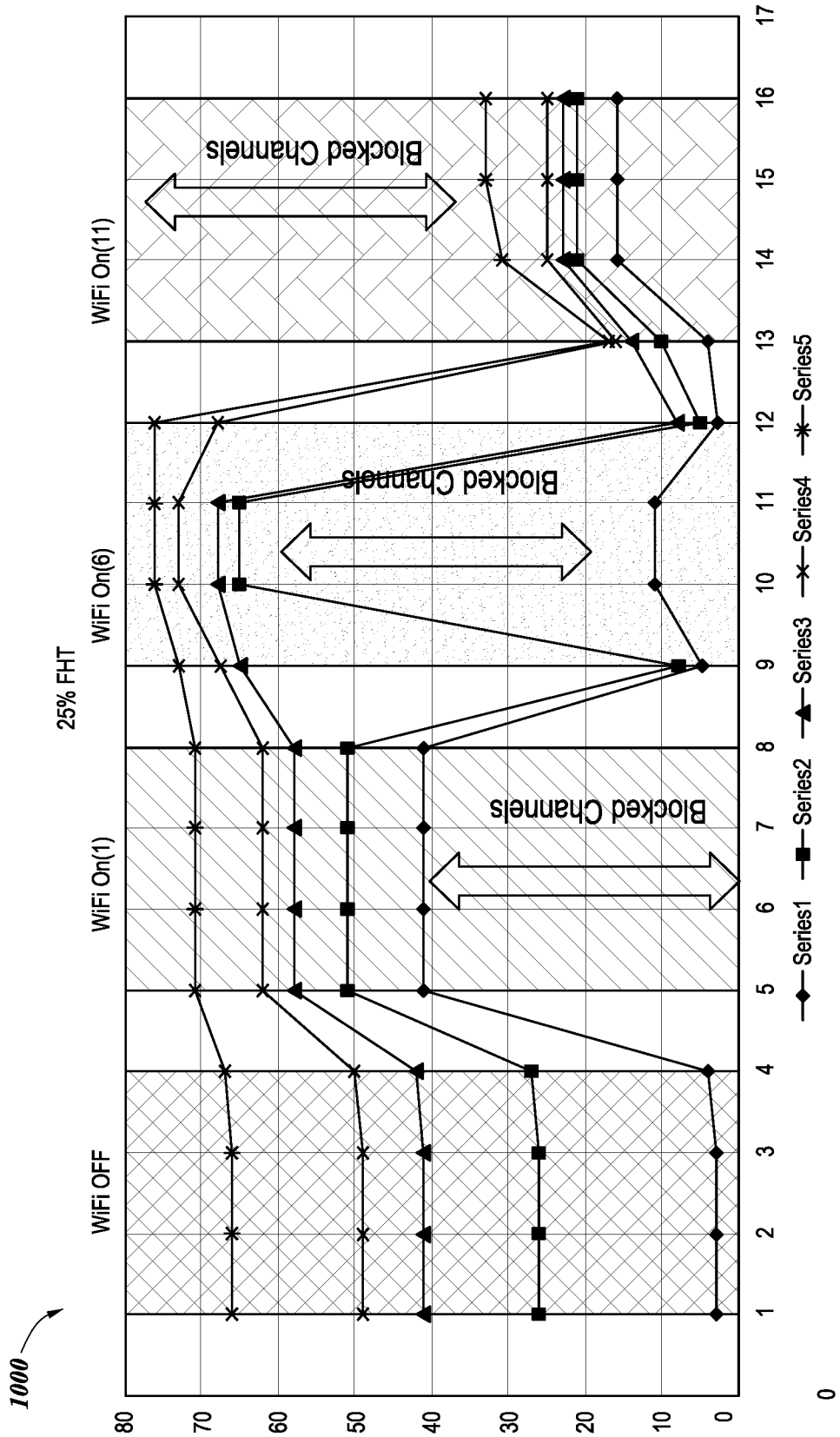
FIG. 10 depicts a graph illustrating an example of how channels associated with the detected current channel being used for WLAN communication can be blocked for a plurality of situations.

FIG. 10 includes a graph 1000 illustrating how channels associated with detected current channel being used for WLAN communication can be blocked for each of the situations where WiFi is off, WiFi is on using channel 1, WiFi is on using channel 6, and WiFi is on using channel 11. Channels 1, 6, and 11 are used for illustrative purposes. In some embodiments, WiFi may be on using channels different than 1, 6, and 11 as illustrated in FIG. 10. In these examples, the number of blocked channels N=40, and the channel PER threshold was FHT=25%. Note that when WiFi is off, no channels are blocked. When WiFi is on, channels hop but avoid the blocked channels in the WLAN spectrum. In some embodiments, the number of blocked channel N may be less than 40 or more than 40.

Figure 11:
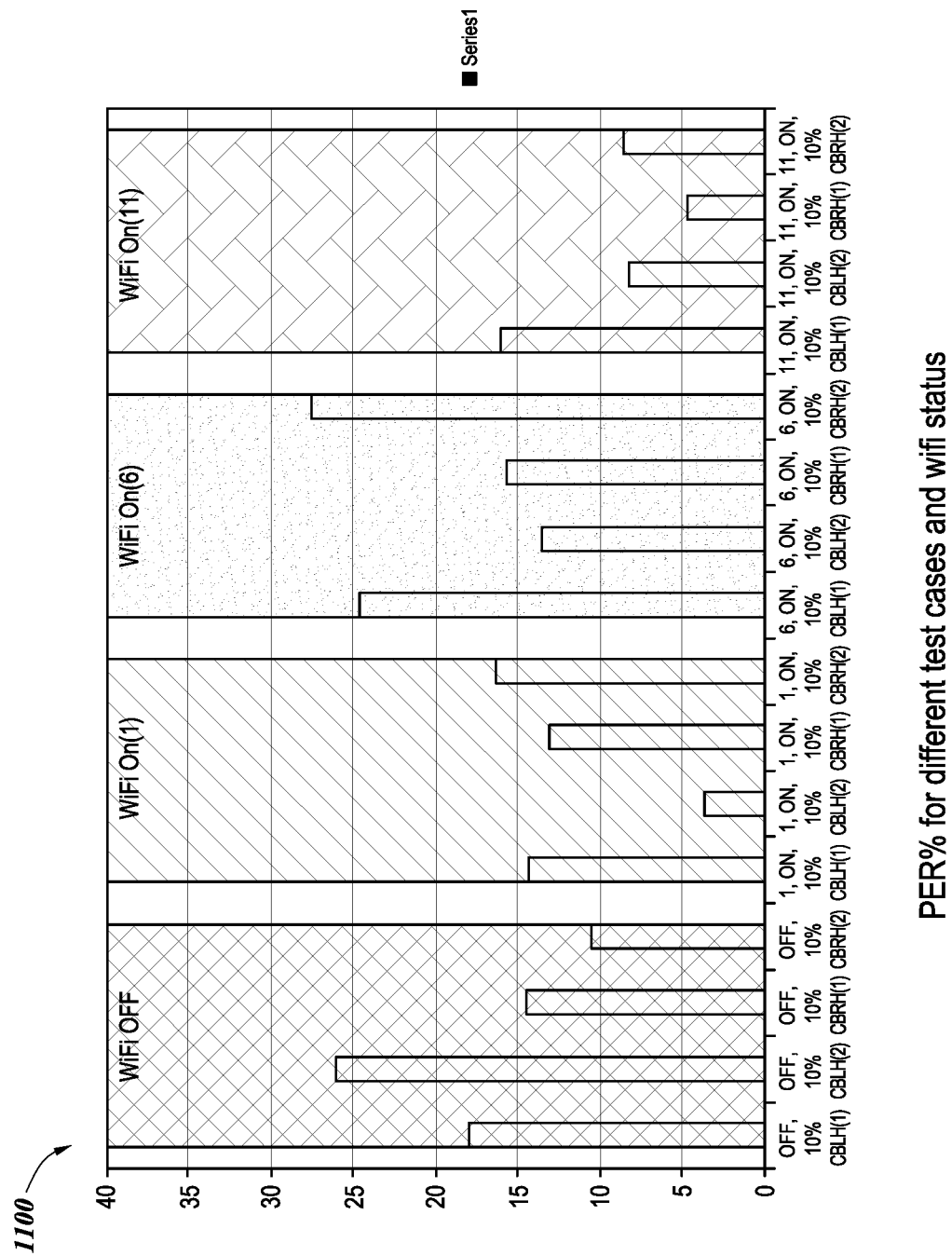
FIG. 11 depicts a graph illustrating the system PER on the vertical axis that corresponds with each test condition for different test cases that simulate different channel interference.

FIG. 11 includes a graph 1100 illustrating system PER on a vertical axis that corresponds with each test condition (WLAN Off/On) for different test cases that simulate different channel interference. FIG. 11 shows that system PER with WLAN turned on is comparable to the case when WLAN is turned off by using an embodiment of the AFH algorithm described herein. Accordingly, AFH that avoids hopping to blocked channels in the WLAN spectrum advantageously reduces interference to levels as if WiFi were disabled.

Example Adaptive Frequency Hopping (AFH) Method

Figure 12:
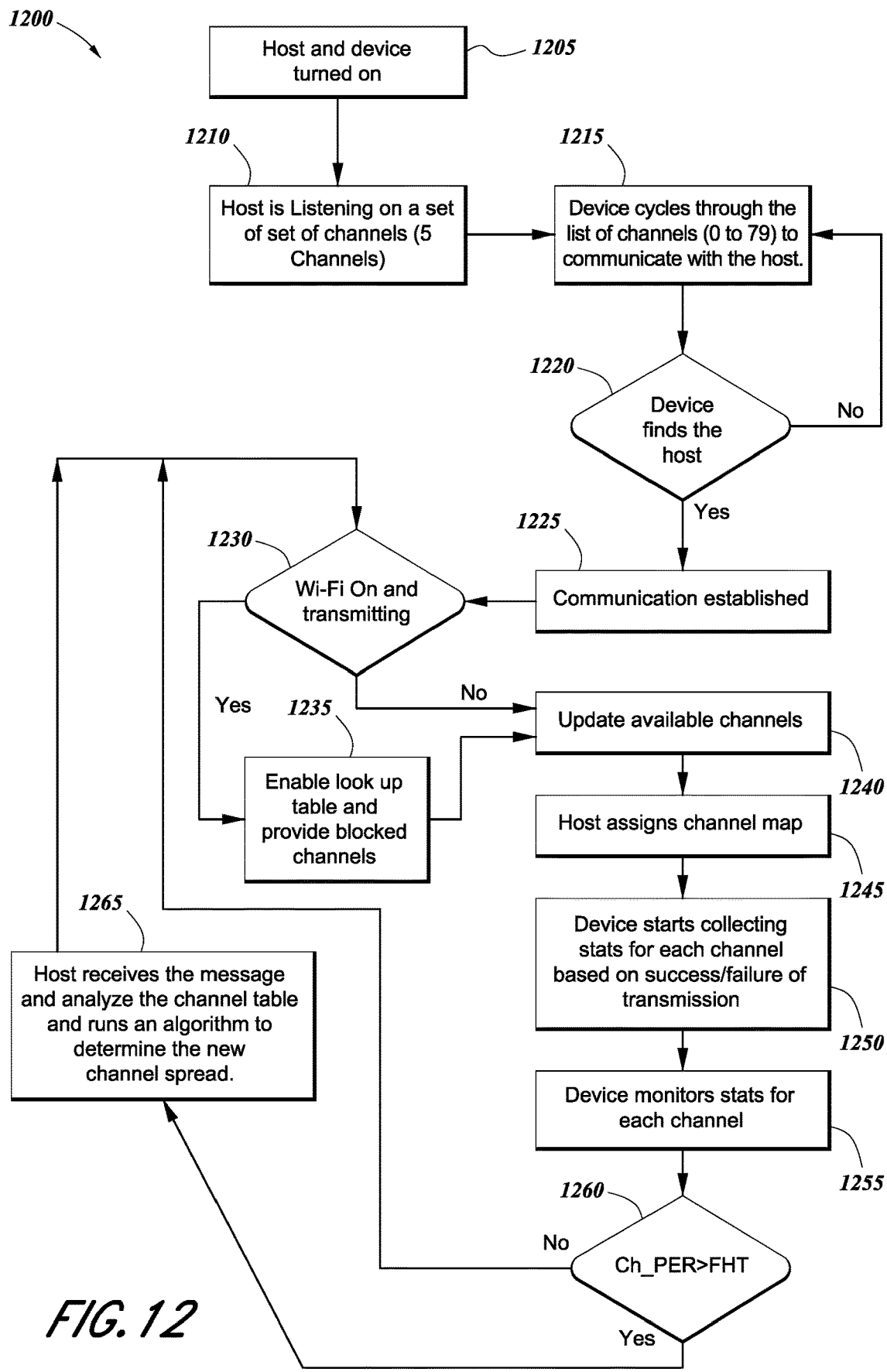
FIG. 12 depicts a flowchart illustrating an example method for performing AFH.

FIG. 12 is a flowchart illustrating an example method 1200 for performing AFH. When executed by the host device 500, the method 1200 may be performed at least in part by the application processor 505 and when executed by the local processing and data module 70, the method 1200 can be performed at least in part by the processor 128. Certain blocks of the method 1200 may also be performed by other components, such as by the proprietary radio 510, the secondary radio 515, the terminal device 605, and/or the router 610. Depending on the implementation, certain blocks may be reordered and/or removed entirely from the method 1200.

At block 1205, the method 1200 is initiated when both the host device 500 and the terminal device 605 are turned on. Subsequently, at block 1210, the host device 500 listens on a set of channels (e.g., 5 channels) from one or more assigned channels (e.g., channels 0 to 79) spread across at least a portion of the available band (e.g., 2.4 GHz band). At block 1215, which may be performed concurrently with block 1210, the terminal device 605 cycles through the list of channels to communicate with the host device 500. As the terminal device 605 cycles through the channels, at block 1220, the terminal device 605 determines whether it has found, or otherwise operatively connected to, the host device 500. If the terminal device 605 has not found the host device 500, the terminal device 605 continues cycling through the list of channels at block 1215.

In response to finding the host device 500 at block 1220, the method 1200 continues by establishing communication between the host device 500 and the terminal device 605 at block 1225. Establishing communication may be performed partially by each of the host device 500 and the terminal device 605. At block 1230, the host device 500 determines whether WiFi (e.g., from WLAN router 610) is on and transmitting. This may involve determining that the WiFi is using a band that is the same as or at least partially overlapping with the band used by the proprietary radio 510 (e.g., the 2.4 GHz band).

When the host device 500 determines that WiFi is on and transmitting, at optional block 1235 the host device 500 enables a LUT which defines a list of blocked channels (e.g., based on the channels over which WiFi is broadcast; see, e.g., FIGS. 9-11). From each of blocks 1230 and 1235, the method 1200 continues at block 1240 in which the host device 500 updates the list of available channels. At block 1245, the host device 500 assigns a channel map based on the available channels. At block 1250, the terminal device 605 begins collecting statistics, such as those illustrated in FIG. 7, for each channel currently used for wireless communication with the host device 500, based on the success/failure rate of transmission. The terminal device 605 may use success/failure rate of transmission to determine a channel statistic (e.g., PER or BER) for each channel.

At block 1255, the terminal device 605 monitors the statistics for each channel. For example, the terminal device 605 may compare the PER for a given channel (channel PER) to a performance threshold (e.g., FHT) in block 1260. When the PER for a given channel (channel PER) is less than or equal to the FHT, the method 1200 loops back to block 1230. When the PER for a given channel (channel PER) is greater than to the FHT (which indicates that substantial interference is occurring in this channel), the method 1200 continues at block 1265, where the host device 500 receives a message from the terminal device 605 indicating that the channel PER for a specified channel has exceeded the FHT. In response, the host device 500 runs an AFH algorithm to determine a new channel spread, which may result in a channel spread as illustrated in FIG. 9 or 10.

In some embodiments, the AFH algorithm performed by the host device 500 at block 1265 may involve selecting a new channel to replace the channel specified by the received message according to a set of rules. The set of rules may include any one or more of the following rules.

In a first rule, the new channel is selected such that the new channel does not coincide with active WiFi channels (when WiFi was determined to be on and transmitting in block 1230). This may involve selecting a new channel which is not in the set of blocked channels identified in the look-up table enabled at block 1235.

In a second rule, the new channel may be selected to have a minimum channel separation from other channels in the map to reduce or avoid channel clumping. As discussed above, the minimum channel spacing may include at least two channels separating the new channel and other channels currently being used for wireless communication by the proprietary radio 610.

In a third rule, the new channel may not be selected from any channel recently identified as having poor performance within a threshold time period prior to the selection of the new channel. This may be implemented as a "cool-down" time period for channels identified as having a channel PER greater than the FHT, where the identified channels are not selected as a new channel until the time period has elapsed.

Once a new channel has been selected in block 1265, the method 1200 may continue by looping back to block 1230. The method 1200 may continuously loop while the proprietary radio 510 is wireless connected to the terminal device 605.

Another Example Adaptive Frequency Hopping (AFH) Algorithm

Figure 13:
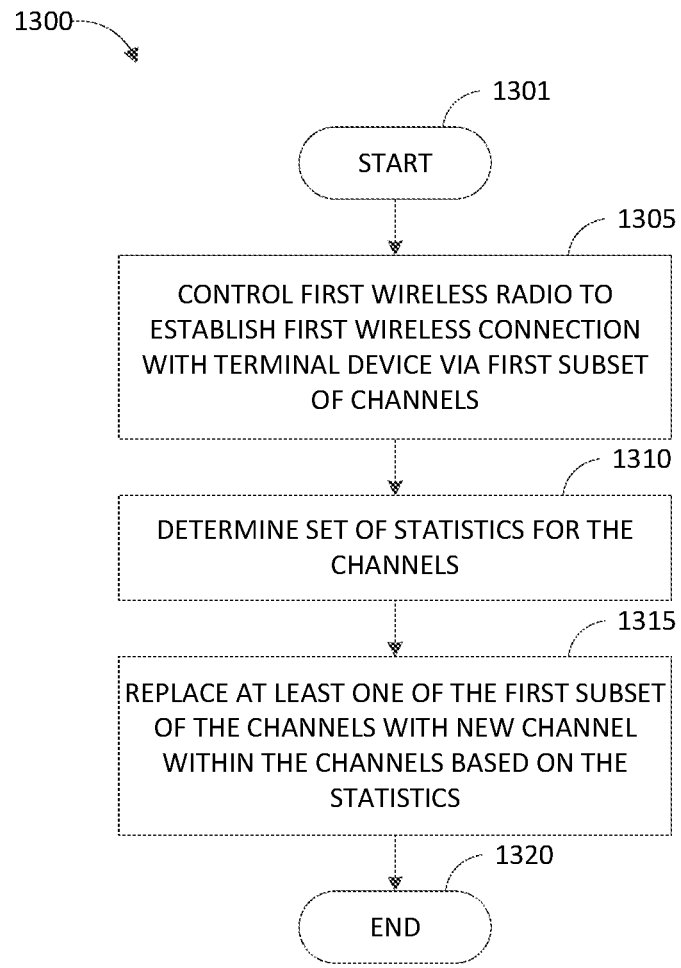
FIG. 13 depicts a flowchart illustrating an example method for performing AFH.

FIG. 13 is a flowchart illustrating another example method 1300 for performing AFH. The method 1300 may be executed under control of a host device, such as the host device 500. The host device 500 may include (i) a first wireless radio configured to wirelessly communicate with a terminal device, such as the terminal device 605, within a first band in which one or more channels are defined, (ii) a second wireless radio configured to wirelessly communicate with another wireless device within a second band at least partially overlapping with the first band, and (iii) a hardware processor. As described herein, a wearable display system can include the host device 500.

The method 1300 starts at block 1301. At block 1305, the method 1300 involves controlling the first wireless radio to establish a first wireless connection with the terminal device 605 via a first subset of the channels. At block 1310, the method 1300 involves determining a set of statistics for the channels. At block 1315, the method 1300 involves replacing at least one of the first subset of the channels with a new channel within the one or more channels based on the statistics. The method 1300 ends at block 1320.

The method 1300 is intended to be illustrative and not limiting. The various blocks described herein can be implemented in a variety of orders, and that the host device 500 can implement one or more of the blocks concurrently or change the order, as desired. Fewer, more, or different blocks can be used as part of the method 1300.

Additional Aspects

Aspect 1. A host device comprising: a first wireless radio configured to wirelessly communicate with a terminal device within a first band comprising a plurality of channels; a second wireless radio configured to wirelessly communicate with another wireless device within a second band at least partially overlapping with the first band; a hardware processor configured to: control the first wireless radio to establish a first wireless connection with the terminal device via a first subset of the channels; determine a set of performance statistics for the channels; and replace at least one of the first subset of the channels with a new channel within the plurality of channels based at least partly on the performance statistics.

Aspect 2. The host device of aspect 1, wherein the hardware processor is further configured to: determine that the second wireless radio has established a second wireless connection with the other wireless device; update a set of blocked channels; and select the new channel based at least partly on the set of blocked channels, wherein the new channel is not one of the blocked channels.

Aspect 3. The host device of aspect 1 or aspect 2, wherein: the performance statistics for each of the channels comprises a packet error rate (PER), and the hardware processor is further configured to select the at least one of the first subset of the channels for replacement based on the PER.

Aspect 4. The host device of aspect 3, wherein the hardware processor is further configured to: determine that the PER for a first one of the first subset of the channels is greater than a frequency hopping threshold (FHT); and select the first one of the first subset of the channels for replacement in response to determining that the PER for the first one of the first subset of the channels is greater than the FHT.

Aspect 5. The host device of any one of aspects 1 to 4, wherein the hardware processor is further configured to: select as the new channel one of the plurality of channels that is separated from each of the remaining channels in the first subset of the channels by at least two channels.

Aspect 6. The host device of any one of aspects 1 to 5, wherein the hardware processor is further configured to: determine that the host device has moved out of range of the terminal device; determine a second subset of the channels having the lowest PER; and attempt to reconnect to the terminal device on the second subset of the channels.

Aspect 7. The host device of any one of aspects 1 to 6, wherein the hardware processor is further configured to: maintain a list of channels having a PER greater than the FHT within a previous time period; and refrain from selecting any of the channels from the list of channels having a PER greater than the FHT as the new channel.

Aspect 8. The host device of any one of aspects 1 to 7, wherein the first band completely overlaps the second band.

Aspect 9. The host device of any one of aspects 1 to 8, wherein the hardware processor is further configured to: receive the set of statistics from the terminal device.

Aspect 9A. A wearable display system comprising the host device of any one of aspects 1 to 9.

Aspect 9B. The wearable display system of aspect 9A, wherein the wearable display system comprises a head mounted display and a hand held component, wherein (i) the head mounted display comprises the host device, (ii) the hand held component comprises the host device, or both (i) and (ii).

Aspect 10. A wearable display system, comprising: a display configured to be positioned in front of an eye of a user, the display configured to project virtual content toward an eye of the user; non-transitory storage configured to store virtual icons associated with a library of virtual content; a host device, comprising: (i) a first wireless radio configured to wirelessly communicate with a terminal device within a first band in which a plurality of channels are defined, (ii) a second wireless radio configured to wirelessly communicate with another wireless device within a second band at least partially overlapping with the first band, and (iii) a hardware processor configured to: control the first wireless radio to establish a first wireless connection with the terminal device via a first subset of the channels; determine a set of statistics for the channels; and replace at least one of the first subset of the channels with a new channel within the plurality of channels based on the statistics.

Aspect 11. The wearable display system of aspect 10, wherein the hardware processor is further configured to: determine that the second wireless radio has established a second wireless connection with the other wireless device; update a set of blocked channels stored in the memory; and select the new channel based on the set of blocked channels.

Aspect 12. The wearable display system of aspect 10 or aspect 11, wherein: the statistics for each of the channels comprises a packet error rate (PER), and the hardware processor is further configured to select the at least one of the first subset of the channels for replacement based on the PER.

Aspect 13. The wearable display system of aspect 12, wherein the hardware processor is further configured to: determine that the PER for a first one of the first subset of the channels is greater than a frequency hopping threshold (FHT); and select the first one of the first subset of the channels for replacement in response to determining that the PER for the first one of the first subset of the channels is greater than the FHT.

Aspect 14. The wearable display system of any one of aspects 10 to 13, wherein the hardware processor is further configured to: select as the new channel one of the plurality of channels that is separated from each of the remaining channels in the first subset of the channels by at least two channels.

Aspect 15. The wearable display system of any one of aspects 10 to 14, wherein the hardware processor is further configured to: determine that the host device has moved out of range of the terminal device; determine a second subset of the channels having the lowest PER; and attempt to reconnect to the terminal device on the second subset of the channels.

Aspect 16. The wearable display system of any one of aspects 10 to 15, wherein the hardware processor is further configured to: maintain a list of channels having a PER greater than the FHT within a previous time period; and refrain from selecting any of the channels from the list of channels having a PER greater than the FHT as the new channel.

Aspect 17. The wearable display system of any one of aspects 10 to 16, wherein the first band completely overlaps the second band.

Aspect 18. The wearable display system of any one of aspects 10 to 17, wherein the hardware processor is further configured to: receive the set of statistics from the terminal device.

Aspect 19. A method, comprising: under control of a host device, comprising: (i) a first wireless radio configured to wirelessly communicate with a terminal device within a first band in which a plurality of channels are defined, (ii) a second wireless radio configured to wirelessly communicate with another wireless device within a second band at least partially overlapping with the first band, and (iii) a hardware processor: controlling the first wireless radio to establish a first wireless connection with the terminal device via a first subset of the channels; determining a set of statistics for the channels; and replacing at least one of the first subset of the channels with a new channel within the plurality of channels based on the statistics.

Aspect 20. The method of aspect 19, further comprising: determining that the second wireless radio has established a second wireless connection with the other wireless device; updating a set of blocked channels stored in the memory; and selecting the new channel based on the set of blocked channels.

Aspect 21. The method of aspect 19 or aspect 20, wherein: the statistics for each of the channels comprises a packet error rate (PER), and the method further comprises selecting the at least one of the first subset of the channels for replacement based on the PER.

Aspect 22. The method of aspect 21, further comprising: determining that the PER for a first one of the first subset of the channels is greater than a frequency hopping threshold (FHT); and selecting the first one of the first subset of the channels for replacement in response to determining that the PER for the first one of the first subset of the channels is greater than the FHT.

Aspect 23. The method of any one of aspects 19 to 22, further comprising: selecting as the new channel one of the plurality of channels that is separated from each of the remaining channels in the first subset of the channels by at least two channels.

Aspect 24. The method of any one of aspects 19 to 23, further comprising: determining that the host device has moved out of range of the terminal device; determining a second subset of the channels having the lowest PER; and attempting to reconnect to the terminal device on the second subset of the channels.

Aspect 25. The method of any one of aspects 19 to 24, further comprising: maintaining a list of channels having a PER greater than the FHT within a previous time period; and refraining from selecting any of the channels from the list of channels having a PER greater than the FHT as the new channel.

Aspect 26. The method of any one of aspects 19 to 25, wherein the first band completely overlaps the second band.

Aspect 27. The method of any one of aspects 19 to 26, further comprising: receiving the set of statistics from the terminal device.

Aspect 27A. A wearable display system comprising a host device configured to perform the method of any one of aspects 19 to 27.

Aspect 27B. The wearable display system of aspect 27A, wherein the wearable display system comprises a head mounted display and a hand held component, wherein (i) the head mounted display comprises the host device, (ii) the hand held component comprises the host device, or both (i) and (ii).

Additional Considerations

Although certain embodiments of the techniques for reduction or avoidance of coexistence interference between different radios operating in the same RF band are described in the context of the wearable display system 58, this is for illustration and not limitation. Embodiments of the RF coexistence interference reduction technology can be used in other applications and with other devices and in general can be applied to any wireless system comprising multiple radios (proprietary or non-proprietary) operating in the same RF band.

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. Further, wireless communication typically needs to be done in real time in an AR or VR environment (e.g., to avoid latency and to improve the user experience), and hardware processing circuitry is required to perform the wireless communication to provide an enjoyable user experience.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, a satellite network, the Internet, and the World Wide Web. The network may be a wired or a wireless network or any other type of communication network.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Elements, actions, steps or blocks of methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A host device comprising:
  a first wireless radio configured to wirelessly communicate within a first band that includes a plurality of channels;
  a second wireless radio configured to wirelessly communicate within a second band that at least partly overlaps with the first band; and
  a hardware processor configured to:
    use the first wireless radio to establish a first wireless connection with a first device using a first subset of channels in the plurality of channels;
    determine an error rate for each of the plurality of channels;
    in response to determining that the error rate for one or more of the first subset of channels exceeds a predetermined threshold error rate, identify a second subset of channels based at least partly on the second subset exhibiting a lower error rate than the first subset; and
    attempt to connect to the first device using the second subset of channels, wherein identifying the second subset of channels further comprises:
    identifying a second channel of the plurality of channels that has an error rate less than the predetermined threshold error rate; and
    replacing a first channel in the first subset of channels with the second channel to determine the second subset of channels, and
    wherein identifying the second channel is further based on the second channel being separated from each of the channels in the first subset of channels by at least two channels.

2. The host device of claim 1, wherein the error rate for one or more of the first subset of channels exceeds the predetermined threshold error rate due to the host device moving out of range of the first device with respect to the first subset of channels, and wherein the second subset of channels is identified based at least partly on the second subset exhibiting a lowest error rate among subsets of the plurality of channels during a previous time period.

3. The host device of claim 1, wherein the error rate for one or more of the first subset of channels exceeds the predetermined threshold error rate due to an antenna on the first device being at least partly covered by a body part of a user manipulating the first device.

4. The host device of claim 1, wherein the error rate is a packet error rate.

5. The host device of claim 1, wherein the hardware processor is further configured to determine that the second wireless radio has established a second wireless connection with a second device, and wherein the second subset of channels omits a blocked channel that is being used for the second wireless connection.

6. The host device of claim 5, wherein the second device is a router.

7. The host device of claim 1, wherein the second subset of channels omits a blocked channel that has exhibited an error rate greater than the predetermined threshold error rate within a previous time period.

8. The host device of claim 1, wherein the hardware processor is further configured to receive the error rate for each of the plurality of channels from the first device.

9. The host device of claim 1, wherein the first device is a wireless terminal device.

10. The host device of claim 1, wherein the first band and the second band are the same.

11. A method for controlling communications of a host device, the method performed by a hardware processor of the host device and comprising:
   controlling a first wireless radio of the host device, the first wireless radio configured to wirelessly communicate within a first band that includes a plurality of channels;
   controlling a second wireless radio of the host device, the second wireless radio configured to wirelessly communicate within a second band that at least partly overlaps with the first band;
   using the first wireless radio to establish a first wireless connection with a first device using a first subset of channels in a plurality of channels;
   determining an error rate for each of the plurality of channels;
   in response to determining that the error rate for one or more of the first subset of channels exceeds a predetermined threshold error rate, identifying a second subset of channels based at least partly on the second subset exhibiting a lower error rate than the first subset; and
      attempting to connect to the first device using the second subset of channels wherein identifying the second subset of channels further comprises:
      identifying a second channel of the plurality of channels that has an error rate less than the predetermined threshold error rate; and
      replacing a first channel in the first subset of channels with the second channel to determine the second subset of channels, and
   wherein identifying the second channel is further based on the second channel being separated from each of the channels in the first subset of channels by at least two channels.

12. The method of claim 11, wherein the error rate for one or more of the first subset of channels exceeds the predetermined threshold error rate due to the host device moving out of range of the first device with respect to the first subset of channels, and wherein the second subset of channels is identified based at least partly on the second subset exhibiting a lowest error rate among subsets of the plurality of channels during a previous time period.

13. The method of claim 11, wherein the error rate for one or more of the first subset of channels exceeds the predetermined threshold error rate due to an antenna on the first device being at least partly covered by a body part of a user manipulating the first device.

14. The method of claim 11, further comprising determining that the second wireless radio has established a second wireless connection with a second device, wherein the second subset of channels omits a blocked channel that is being used for the second wireless connection.

15. The method of claim 11, wherein the second subset of channels omits a blocked channel that has exhibited an error rate greater than the predetermined threshold error rate within a previous time period.

16. The method of claim 11, further comprising receiving the error rate for each of the plurality of channels from the first device.

* * * * *